(12) United States Patent  
Sumihara et al.

(10) Patent No.: US 7,998,612 B2  
(45) Date of Patent: Aug. 16, 2011

(54) SECONDARY BATTERY

(75) Inventors: Masanori Sumihara, Osaka (JP); Tadashi Imai, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/792,371

(22) Filed: Jun. 2, 2010

(65) Prior Publication Data

US 2010/0239897 A1 Sep. 23, 2010

Related U.S. Application Data

(63) Continuation of application No. PCT/JP2009/000353, filed on Jan. 30, 2009.

(30) Foreign Application Priority Data

| Jan. 31, 2008 | (JP) | 2008-020476 |
| Apr. 28, 2008 | (JP) | 2008-116813 |
| Apr. 28, 2008 | (JP) | 2008-116814 |
| Apr. 28, 2008 | (JP) | 2008-116815 |

(51) Int. Cl.
  *H01M 2/02* (2006.01)
  *H01M 2/08* (2006.01)
(52) U.S. Cl. ...................... 429/172; 429/170
(58) Field of Classification Search .......... 429/7, 53–57, 429/94

See application file for complete search history.

(56) References Cited

U.S. PATENT DOCUMENTS

| 5,731,098 A | * | 3/1998 | Suzuki | 429/53 |
| 5,747,187 A | * | 5/1998 | Byon | 429/58 |
| 6,372,380 B1 | | 4/2002 | Kitami et al. | |
| 6,451,473 B1 | * | 9/2002 | Saito et al. | 429/94 |
| 2005/0255376 A1 | | 11/2005 | Cho et al. | |

FOREIGN PATENT DOCUMENTS

| JP | 06-036756 | 2/1994 |
| JP | 08-236102 | 9/1996 |
| JP | 09-045310 | 2/1997 |
| JP | 11-354100 | 12/1999 |
| JP | 2000-311714 | 11/2000 |
| JP | 2003-077449 | 3/2003 |
| JP | 2006-032112 | 2/2006 |
| JP | 2007-533100 | 11/2007 |

* cited by examiner

*Primary Examiner* — Barbara L Gilliam
*Assistant Examiner* — Thomas Wallen
(74) *Attorney, Agent, or Firm* — McDermott Will & Emery LLP

(57) ABSTRACT

An electrode group is constructed by disposing a positive electrode current collector exposed portion on one end side and a negative electrode current collector exposed portion on the other end side. A positive electrode current collector terminal plate and a negative electrode current collector terminal plate are connected to the positive and negative electrode current collector exposed portions, respectively. A conductive coned disc spring is disposed compressed between the positive electrode current collector terminal plate and a sealing plate. The coned disc spring has a dead zone in which the elastic force does not change according to the amount of deformation, and urges the negative electrode current collector terminal plate toward a bottom portion of a battery case with a defined elastic force.

4 Claims, 14 Drawing Sheets

FIG. 5B
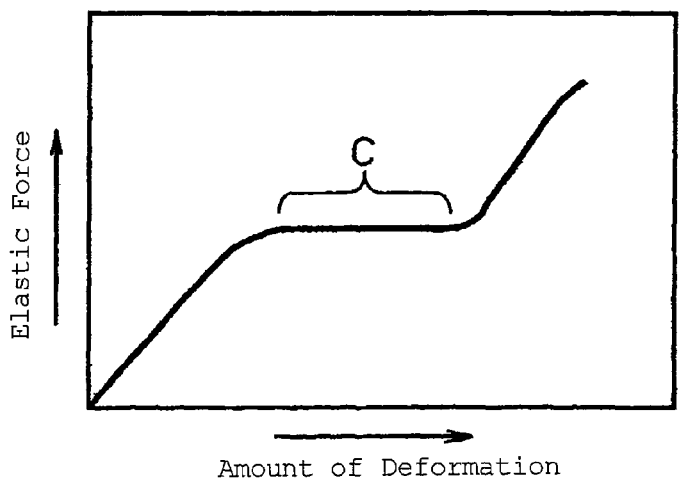
FIG. 6
FIG. 7
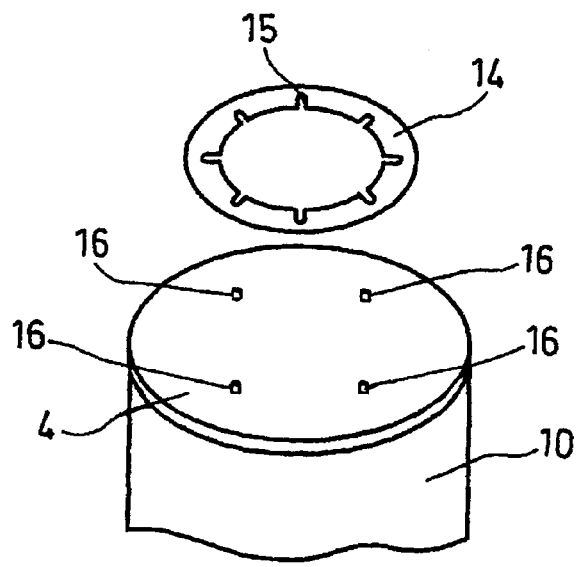
FIG. 8
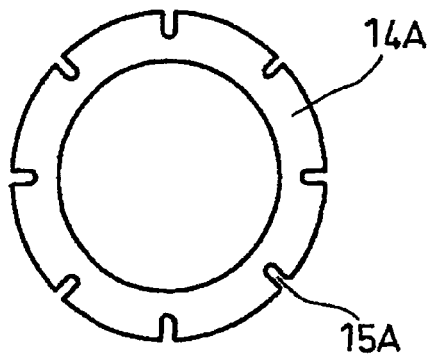

SECONDARY BATTERY

This application is a continuation of International Application No. PCT/JP2009/000353, whose international filing date is Jan. 30, 2009, which in turn claims the benefit of Japanese Patent Application No. 2008-020476 filed on Jan. 31, 2008, Japanese Patent Application No. 2008-116813 filed on Apr. 28, 2008, Japanese Patent Application No. 2008-116814 filed on Apr. 28, 2008, and Japanese Patent Application No. 2008-116815 filed on Apr. 28, 2008, the disclosures of which Applications are incorporated by reference herein. The benefit of the filing and priority dates of the International and Japanese Applications is respectfully requested.

TECHNICAL FIELD

The present invention relates to secondary batteries as typified by a lithium ion battery and a nickel-metal hydride storage battery.

BACKGROUND ART

Along with the trend toward smaller portable electronic devices in recent years, lithium ion batteries and nickel-metal hydride storage batteries are becoming widely used as a power source for such devices. Because lithium ion batteries and nickel-metal hydride storage batteries are highly resistant to vibration and impact, attention has been paid to these batteries as a power source for devices that require a large current such as a cordless electric tool, a power assisted bicycle and a hybrid automobile.

Development has also been underway on the shape of batteries to cope with the devices in which the batteries are used, such as cylindrical batteries and flat batteries. In either shape, reductions in size and weight, and increased power output are required.

FIG. 31 shows a general structure of a secondary battery as typified by a lithium ion battery. A battery 100 shown here includes an electrode group 108 in which a positive electrode plate 102 that employs a lithium-containing composite oxide as an electrode active material and a negative electrode plate 104 that employs a material capable of retaining lithium as an electrode active material are spirally wound with a separator 106 interposed therebetween. The electrode group 108 is housed in a bottomed cylindrical battery case 110 together with insulating plates 112 that are disposed on the top and bottom thereof.

The negative electrode plate 104 is connected to the bottom portion of the battery case 110 by a negative electrode lead 114 taken out from a lower portion of the electrode group 108. The positive electrode plate 102 is connected to a sealing plate 118 by a positive electrode lead 116 taken out from an upper portion of the electrode group 108. In addition, a prescribed amount of non-aqueous electrolyte (not shown) is injected into the battery case 110. The opening portion of the battery case 110 is sealed by folding the opening edge of the battery case 110 inward so as to crimp onto the peripheral portion of the sealing plate 118 over a sealing gasket 120 attached to the periphery of the sealing plate 118.

As described above, in a conventional secondary battery, a belt-shaped positive electrode lead and a belt-shaped negative electrode lead are respectively attached to the current collectors of a positive electrode plate and a negative electrode plate, and the positive electrode plate and the negative electrode plate are respectively connected to a sealing plate and a battery case that serve as external terminals via the leads. However, such a connecting method is problematic in that in a high power output secondary battery that requires a large current, in particular, an IR loss (voltage loss) in the positive electrode lead and the negative electrode lead becomes large, resulting in the degradation of discharge characteristics.

Patent Document 1 has proposed a cylindrical battery for solving the above problem. This battery includes a current collector portion that is in multiple-point contact or multiple-point connection with a spirally wound electrode group (not shown) that is housed in a battery case (see FIG. 1 of Patent Document 1). The current collector portion and a sealing lid are connected by a belt-shaped lead portion and also by a metal spring. With this configuration, the IR loss is reduced, as a result of which the high rate discharge characteristics are improved.

Patent Document 2 has proposed the following non-aqueous electrolyte secondary battery. In this battery, a positive electrode current collector exposed portion protrudes on the upper side of the electrode group (see FIG. 1 of Patent Document 2). Also, a negative electrode current collector exposed portion protrudes on the lower side of the electrode group. On the top and bottom of the electrode group, conductive elastic bodies are disposed so as to make contact with the upper and lower exposed portions, respectively. On the upper side further away from the upper elastic member, a spring for urging the power generating element downward is disposed. With this configuration, the IR loss is reduced, as a result of which the high rate discharge characteristics are improved.

Patent Document 1: Japanese Laid-Open Patent Publication No. H06-36756
Patent Document 2: Japanese Laid-Open Patent Publication No. 2000-311714

DISCLOSURE OF THE INVENTION

Problem to be Solved by the Invention

However, the above-described conventional techniques are problematic in that if there are variations in the height of the spirally wound electrode group as a power generation element of a secondary battery, the contact state between the power generating element and a battery case or sealing plate serving as an external terminal will change, making it unable to maintain a stable conductive state therebetween.

To describe it more specifically, in the cylindrical battery of Patent Document 1, a conductive path is formed by connecting the current collector portion of the electrode group inserted in the battery case and the sealing plate via the metal spring. However, when there are variations in the total height of the electrode group, the pressing force of the metal spring will change, making it difficult to maintain a stable conductive path.

In the non-aqueous secondary battery of Patent Document 2, conductive elastic bodies are disposed on the upper side and the lower side of the electrode group inserted in a battery case, and the electrode group is pressed by the spring from the upper side further away from the upper elastic body, whereby a conductive state is maintained by the elastic forces of these members. However, with Patent Document 2 as well, if variations occur in the thickness of the elastic body, or in the total thickness of the electrode group, it is difficult to maintain a stable conductive state.

The above-described techniques also have another problem in that it is difficult to effectively suppress thermal runaway when the battery temperature rises due to an internal short circuit or the like.

To describe it more specifically, the cylindrical battery of Patent Document 1 is not equipped with a current cutoff mechanism that cuts off current in the event of a rapid temperature increase caused by an internal short circuit or the like, so the current continuously flows via the above described conductive path even when an internal short circuit has occurred. Accordingly, an exothermic reaction spreads over the entire battery, which makes it difficult to prevent thermal runaway. The same occurs in the non-aqueous secondary battery of Patent Document 2.

The present invention has been conceived in view of the above problems, and it is an object of the present invention to provide a highly reliable secondary battery that has a simple structure but is capable of stabilizing a conductive state between a power generating element and an external terminal.

Another object of the present invention is to provide a secondary battery with superior safety, wherein the current between a power generating element and an external terminal can be cut off in the event of a rapid exothermic reaction caused by an internal short circuit or the like, as a result of which a situation that can cause thermal runaway due to heat generation can be avoided.

Means for Solving the Problem

In order to achieve the above objects, the present invention is a secondary battery including: an electrode group that includes a positive electrode plate and a negative electrode plate that are constructed by forming a material mixture layer made of an electrode material mixture that contains an active material on one surface or both surfaces of a long strip-shaped current collector, and forming an exposed portion in which a surface of the current collector is exposed in one end portion in a width direction of the current collector, and a separator that is interposed between the positive electrode plate and the negative electrode plate, the electrode group being constructed by spirally winding or laminating the positive electrode plate, the negative electrode plate and the separator;

a positive electrode current collector terminal plate that is disposed on one end side of the electrode group and is connected to the current collector exposed portion of the positive electrode plate;

a negative electrode current collector terminal plate that is disposed on the other end side of the electrode group and is connected to the current collector exposed portion of the negative electrode plate;

an electrolyte;

a battery case that has an opening portion, is connected to one of the positive electrode current collector terminal plate and the negative electrode current collector terminal plate, and houses the electrode group, the positive electrode current collector terminal plate, the negative electrode current collector terminal plate and the electrolyte;

a sealing plate that is connected to the other of the positive electrode current collector terminal plate and the negative electrode current collector terminal plate and seals the opening portion in an insulated state from the battery case; and one or more elastic members that have conductivity, are disposed at least one of between the battery case and one of the current collector terminal plates and between the sealing plate and the other of the current collector to/urinal plates, electrically connect members that sandwich the elastic member, urge the electrode group toward the battery case or the sealing plate, and have a dead zone in which an elastic force does not fluctuate according to an amount of deformation.

According to a preferred embodiment of the secondary battery of the present invention, the elastic member is configured of a coned disc spring that has a slit in a peripheral portion.

According to another preferred embodiment of the secondary battery of the present invention, the elastic member is covered with at least one metal selected from chromium and nickel.

In addition, according to still another preferred embodiment of the present invention, at least one of the positive electrode current collector terminal plate and the negative electrode current collector terminal plate has a protrusion that engages in the slit of the coned disc spring.

The present invention also provides a secondary battery including: an electrode group that includes a positive electrode plate and a negative electrode plate that are constructed by forming a material mixture layer made of an electrode material mixture that contains an active material on one surface or both surfaces of a long strip-shaped current collector, and forming an exposed portion in which a surface of the current collector is exposed in one end portion in a width direction of the current collector, and a separator that is interposed between the positive electrode plate and the negative electrode plate, the electrode group being constructed by spirally winding or laminating the positive electrode plate, the negative electrode plate and the separator;

a positive electrode current collector terminal plate that is disposed on one end side of the electrode group and is connected to the current collector exposed portion of the positive electrode plate;

a negative electrode current collector terminal plate that is disposed on the other end side of the electrode group and is connected to the current collector exposed portion of the negative electrode plate;

an electrolyte;

a battery case that has an opening portion, is connected to one of the positive electrode current collector terminal plate and the negative electrode current collector terminal plate, and houses the electrode group, the positive electrode current collector terminal plate, the negative electrode current collector terminal plate and the electrolyte;

a sealing plate that is connected to the other of the positive electrode current collector terminal plate and the negative electrode current collector terminal plate and seals the opening portion in an insulated state from the battery case; and one or more conduction cutoff members that are disposed at least one of between the battery case and one of the current collector terminal plates and between the sealing plate and the other of the current collector terminal plates, electrically connect members that sandwich the conduction cutoff member, and cut off a current between the members sandwiching the conduction cutoff member when a prescribed temperature is reached.

According to a preferred embodiment of the secondary battery of the present invention, the conduction cutoff member is made of a conductive non-woven fabric.

According to a more preferred embodiment of the secondary battery of the present invention, the non-woven fabric is made of a fiber of a resin that is coated with a metal on a surface thereof.

According to an even more preferred embodiment of the secondary battery of the present invention, the resin contains at least one selected from polyethylene and polypropylene.

In addition, according to another preferred embodiment of the secondary battery of the present invention, the conduction cutoff member includes an element made of a shape memory alloy.

According to another more preferred embodiment of the secondary battery of the present invention, the shape memory alloy is bidirectional.

According to still another more preferred embodiment of the secondary battery of the present invention, the shape memory alloy is made of an alloy of titanium and nickel.

According to still another more preferred embodiment of the secondary battery of the present invention, the conduction cutoff member includes:

a primary spring that is made of a shape memory alloy and has a natural length that varies according to temperature;

a bias spring that is provided so as to stretch against an elastic force of the primary spring; and a terminal rod that is made of a conductor, includes a force receiving portion that is disposed between the primary spring and the bias spring, is urged to move to a position at which elastic forces of both springs balance, and is supported so as to be capable of movement in an axial direction.

According to still another more preferred embodiment of the secondary battery of the present invention, the conduction cutoff member includes:

a thin plate-like member that is made of a shape memory alloy and switches according to temperature between a shape with a protrusion and a flat shape.

According to still another more preferred embodiment of the secondary battery of the present invention, the conduction cutoff member is made of an anisotropic conductive material that contains a resin.

According to still another more preferred embodiment of the secondary battery of the present invention, the conduction cutoff member is positioned by being abutted against an inner circumference portion of the battery case.

According to still another more preferred embodiment of the secondary battery of the present invention, the anisotropic conductive material includes a conductive filler that contains metal nuclei and a binder that contains a resin.

According to still another more preferred embodiment of the secondary battery of the present invention, the anisotropic conductive material includes a conductive filler that contains metal-plated resin nuclei and a binder that contains a resin.

Effect of the Invention

In a secondary battery of the present invention, one or more conductive elastic members that have a dead zone in which the elastic force does not fluctuate according to the amount of deformation are disposed at least one of between the battery case and one current collector terminal plate and between the sealing plate and the other current collector terminal plate, and the conductive elastic member electrically connects members that sandwich the conductive elastic member and also urges the electrode group toward the battery case or the sealing plate. With this configuration, a defined stress state can be constantly maintained even when there are changes in the size of the electrode group and the size of a current collector terminal plate, and the conductive state between a current collector terminal plate and the battery case or the sealing plate can be stabilized. Accordingly, it is possible to obtain a highly reliable secondary battery in which the conductive state between the power generating element and the external terminal is highly stable.

A secondary battery of the present invention is provided with one or more conduction cutoff members that are disposed at least one of between the battery case and one current collector terminal plate and between the sealing plate and the other current collector terminal plate, and that electrically connects members that sandwich the conduction cutoff member and also cuts off a current between the members sandwiching the conduction cutoff member when a prescribed temperature is reached. With this configuration, when a rapid exothermic reaction caused by an internal short circuit or the like occurs, the current between the members sandwiching the conduction cutoff member is cut off. As a result, it is possible to avoid a situation that can cause thermal runaway due to heat generation to occur in the secondary battery. Accordingly, a highly safe secondary battery can be obtained.

BRIEF DESCRIPTION OF THE DRAWINGS

FIG. 5B is a side view of the coned disc spring used in the secondary battery according to Embodiment 1.

FIG. 6 is a graph showing the relationship between the amount of deformation and the elastic force of the coned disc spring according to Embodiment 1.

FIG. 7 is a perspective view showing an example of a positioning mechanism of the coned disc spring according to Embodiment 1.

FIG. 8 is a plan view showing a variation of the coned disc spring according to Embodiment 1.

BEST MODE FOR CARRYING OUT THE INVENTION

Figure 1:
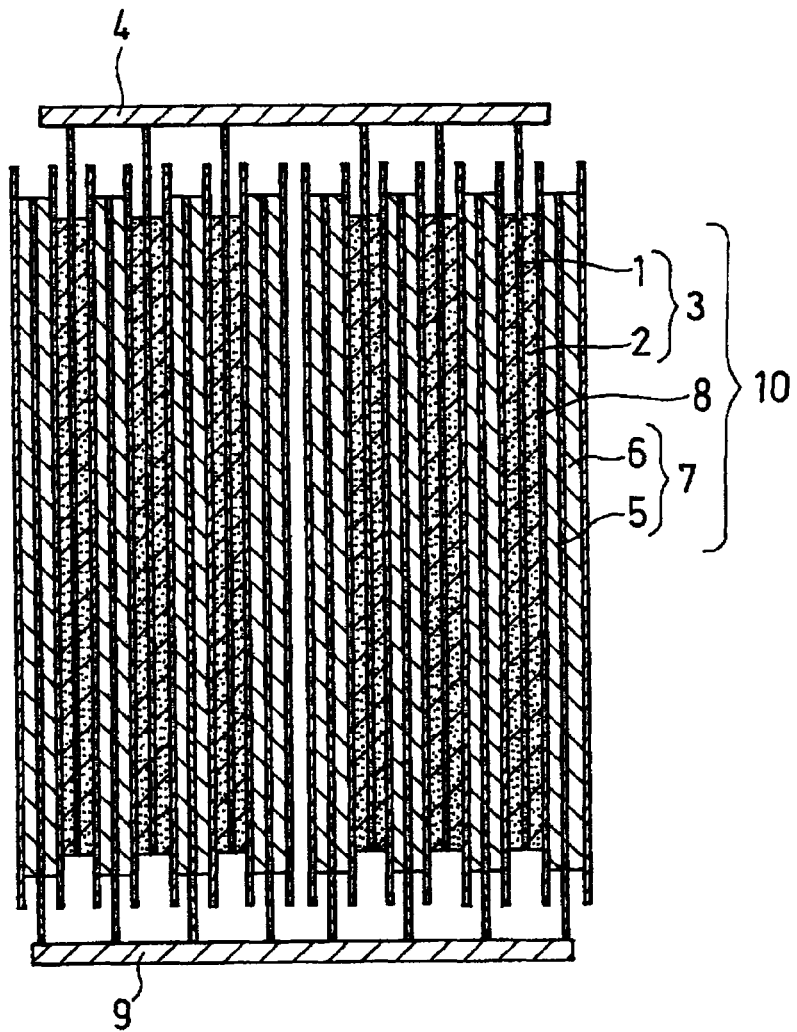
FIG. 1 is a vertical cross-sectional view showing, in detail, an electrode group of a secondary battery according to an embodiment of the present invention.

The present invention relates to a secondary battery that includes an electrode group that includes: a positive electrode plate and a negative electrode plate that are constructed by forming a material mixture layer made of an electrode material mixture that contains an active material on one surface or both surfaces of a long strip-shaped current collector and forming an exposed portion in which a surface of the current collector is exposed in one end portion in the width direction of the current collector; and a separator that is interposed between the positive electrode plate and the negative electrode plate, the electrode group being constructed by spirally winding or laminating the positive electrode plate, the negative electrode plate and the separator. The secondary battery further includes: a positive electrode current collector terminal plate that is disposed on one end side of the electrode group and is connected to the exposed portion of the positive electrode plate; a negative electrode current collector terminal plate that is disposed on the other end side of the electrode group and is connected to the exposed portion of the negative electrode plate; an electrolyte; a battery case that has an opening portion, is connected to one of the positive electrode current collector terminal plate and the negative electrode current collector terminal plate, and houses the electrode group, the positive electrode current collector terminal plate, the negative electrode current collector terminal plate and the electrolyte; a sealing plate that is connected to the other of the positive electrode current collector terminal plate and the negative electrode current collector terminal plate and seals the opening portion in an insulated state from the battery case; and one or more elastic members that have conductivity, are disposed at least one of between the battery case and one of the current collector terminal plates and between the sealing plate and the other of the current collector terminal plates, electrically connect members that sandwich the elastic member, urge the electrode group toward the battery case or the sealing plate, and have a dead zone in which elastic force does not fluctuate according to the amount of deformation.

With the above-described configuration, even when there are variations between products in the size of the electrode group to which the positive electrode current collector terminal plate and the negative electrode current collector terminal plate have been attached, or the size thereof changes over time, the electrode group is urged by the elastic member within the dead zone region of the amount of change, whereby it is possible to constantly bring the positive electrode current collector terminal plate and the negative electrode current collector terminal plate into contact with the battery case or the sealing plate with a defined pressing force. Accordingly, it becomes possible to improve the stability of the conductive state between the power generating element and the external terminal of the secondary battery, as a result of which a highly reliable secondary battery can be obtained.

In this configuration, when a plurality of elastic members for urging an electrode group are stacked in the stretch direction for use, a wider dead zone region can be easily obtained. By doing so, the stability of the conductive state between the power generating element and the external terminal of the secondary battery can be improved more easily. However, from the viewpoint of suppressing an increase in the number of components, the number of elastic members is preferably one.

When such an elastic member is disposed both between the battery case and one terminal plate and between the sealing plate and the other terminal plate, the electrode group can be pressed from both sides, whereby the stability of the conductive state between the power generating element and the external terminal of the battery can be further improved.

It is possible that the elastic member is configured from a coned disc spring that has a slit in the peripheral portion.

With such a simple configuration in which only a slit of a prescribed size is formed in a coned disc spring, an elastic member that has a desired dead zone region can be implemented. Accordingly, the above-described effect can be achieved with little increase in costs.

It is preferable that the elastic member is covered with at least one metal selected from chromium and nickel with high withstand voltage.

By covering the elastic member with a metal having high withstand voltage, the withstand voltage of the elastic member are improved. Accordingly, degradation over time of the elastic member to which voltage is normally applied can be suppressed. In this regard, it is preferable that the elastic member is disposed only between the negative electrode current collector terminal plate and the external terminal (battery case or sealing plate). By doing so, it is possible to suppress degradation over time due to the constant application of voltage to the elastic member.

In the secondary battery of the present invention, at least one of the positive electrode current collector terminal plate and the negative electrode current collector terminal plate may have a protrusion that engages in the slit of the coned disc spring.

With this configuration, the position of the coned disc spring within the battery case can be set, as a result of which it is possible to prevent the occurrence of a conduction failure due to the pressing force being applied unevenly to the right or left.

The present invention also relates to a secondary battery that includes one or more conduction cutoff members that are disposed at least one of between the battery case and one of the current collector terminal plates and between the sealing plate and the other of the current collector terminal plates, electrically connect members that sandwich the conduction cutoff member, and cut off a current between the members sandwiching the conduction cutoff member when a prescribed temperature is reached.

With this configuration, when a rapid exothermic reaction occurs due to an internal short circuit or the like, the current between the power generating element and the external terminal of the secondary battery is cut off. Accordingly, the safety of the secondary battery can be improved.

It is possible that the conduction cutoff member is made of a conductive non-woven fabric.

With this configuration, when a rapid exothermic reaction occurs due to an internal short circuit or the like, the fiber constituting the non-woven fabric is softened or melted and loses its elasticity, making it unable to maintain the conductive state between the members sandwiching the conduction cutoff member, as a result of which the current therebetween is cut off. It is therefore possible to eliminate the possibility that the secondary battery might undergo thermal runaway due to an internal short circuit or the like.

Such a non-woven fabric can be made of a resin fiber that is coated with a metal on the surface thereof.

By configuring a conduction cutoff member by using such a non-woven fabric, appropriate elasticity can be imparted to the conduction cutoff member. With this configuration, in addition to the effect of improving the safety of the secondary battery, an effect of improving the stability of the conductive state between the power generating element and the external terminal can be achieved as well.

It is possible that the resin contains at least one selected from polyethylene and polypropylene.

By doing so, the non-woven fabric starts to deform or melt so as to cut off the current between the power generating element and the external terminal at an appropriate temperature to stop the thermal runaway of the secondary battery.

It is also possible that the conduction cutoff member includes an element made of a shape memory alloy.

With such a shape memory alloy that remembers a deformed shape of the element such that the current between the members sandwiching the conduction cutoff member is cut off when the temperature of the secondary battery rises due to an internal short circuit or the like, it is possible to eliminate the possibility that the secondary battery might undergo thermal runaway. Accordingly, a highly safe secondary battery can be obtained.

It is preferable that the shape memory alloy is bidirectional.

With the use of such an alloy, it is possible to construct a reversible conduction cutoff member that cuts off the current between the power generating element and the external terminal when the secondary battery rises to a high temperature due to an exothermic reaction caused by an internal short circuit or the like, and electrically connects the power generating element and the external terminal when the exothermic reaction settles down and the secondary battery returns to a normal temperature.

Such a shape memory alloy can be made from an alloy of titanium and nickel. With the use of such an alloy, it is possible to cut off current quickly in response to an exothermic reaction.

It is also possible to configure the conduction cutoff member to include: a primary spring that is made of a shape memory alloy and has a natural length that varies according to temperature; a bias spring that is provided so as to stretch against the elastic force of the primary spring; and a terminal rod that is made of a conductor, includes a force receiving portion that is disposed between the primary spring and the bias spring, is urged to move to a position at which the elastic forces of both springs balance, and is supported so as to be capable of moving in the axial direction.

With this configuration, the primary spring is stretched and contracted according to the temperature so as to move the terminal rod, whereby the conductive state of the secondary battery can be switched according to the temperature. In addition, the electrode group is urged toward the sealing plate or the bottom portion of the battery case by the elastic forces of both springs, as a result of which the effect of stabilizing the conductive state between the power generating element and the external terminal can be obtained.

The conduction cutoff member may be configured from a thin plate-like member that is made of a shape memory alloy and switches between a shape with a protrusion and a flat shape according to the temperature.

With this configuration, by changing the shape of the thin plate-like member according to the temperature, the conductive state of the secondary battery can be switched according to the temperature. In addition, by urging the electrode group toward the sealing plate or the bottom portion of the battery case by the elastic force of the thin plate-like member with a protrusion, the effect of stabilizing the conductive state between the power generating element and the external terminal can be obtained as well.

The conduction cutoff member may be made of an anisotropic conductive material that contains a resin.

With this configuration, when a rapid exothermic reaction occurs due to an internal short circuit or the like, the anisotropic conductive material is melted or deformed by heat generated by the reaction, whereby the current can be cut off. Accordingly, the safety of the secondary battery can be improved.

At this time, when a conduction cutoff member made of an anisotropic conductive material is configured such that it is positioned by being abutted against the inner circumference portion of the battery case, the need for a mechanism for positioning a conduction cutoff member is eliminated, so a simpler structure can be achieved. Preferably, the conduction cutoff member is abutted against a portion of the battery case that is narrowed so that the sealing plate is crimped. By doing so, the sealing properties can be improved as well.

The anisotropic conductive material that constitutes such a conduction cutoff member can be made of a conductive filler that contains metal nuclei and a binder that contains a resin.

In this configuration, the metal nuclei come into contact with each other at room temperature, whereby the positive and negative current collector terminal plates and the battery case or the sealing plate are electrically connected, whereas when the temperature of the secondary battery rises above a prescribed temperature, the binder melts or deforms, whereby the contact between metal nuclei is no longer secured and, as a result, the current is cut off.

The anisotropic conductive material that constitutes a conduction cutoff member can be made of a conductive filler that contains metal-plated resin nuclei and a binder that contains a resin.

In this configuration, the conductive filler particles come into contact with each other at room temperature, whereby the positive and negative current collector terminal plates and the battery case or the sealing plate are electrically connected, whereas when the temperature of the secondary battery rises above a prescribed temperature, at least one of the resin nuclei or the binder melts or deforms by heat, whereby the contact between conductive filler particles is no longer secured and, as a result, the current is cut off.

Embodiment 1

Hereinafter, Embodiment 1 of the present invention will be described with reference to the accompanying drawings. FIG. 1 is a vertical cross-sectional view showing a schematic configuration of an electrode group used in a secondary battery according to Embodiment 1 of the present invention.

An electrode group 10 is constructed by spirally winding a positive electrode plate 3 in which a positive electrode material mixture layer 2 is formed on both surfaces of a long strip-shaped positive electrode current collector 1 and a negative electrode plate 7 in which a negative electrode material mixture layer 6 is formed on both surfaces of a long strip-shaped negative electrode current collector 5 with a separator 8 interposed therebetween.

In the positive electrode current collector 1, an exposed portion in which no positive electrode material mixture layer 2 is formed and the current collector surface is thus exposed is formed in one end portion (the upper end portion of FIG. 1) in the width direction. In the negative electrode current collector 5, an exposed portion in which no negative electrode material mixture layer 6 is formed and the current collector surface is thus exposed is formed in one end portion (the lower end portion of FIG. 1) in the width direction. These exposed portions protrude on one end side and the other end side of the electrode group 10 (the upper and lower sides of FIG. 1).

The positive electrode material mixture layer 2 contains a lithium-containing composite oxide as an active material. The negative electrode material mixture layer 6 contains a material capable of absorbing and desorbing lithium as an active material.

The exposed portion of the positive electrode current collector 1 is connected at multiple points to a disc-shaped positive electrode current collector terminal plate 4 that is disposed on one end side of the electrode group 10. The exposed portion of the negative electrode current collector 5 is connected at multiple points to a disc-shaped negative electrode current collector terminal plate 9 that is disposed on the other end side of the electrode group 10.

Figure 2:
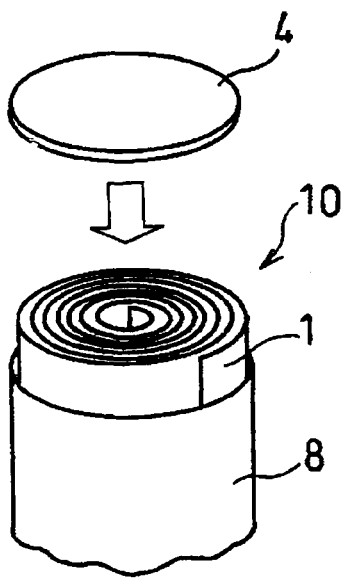
FIG. 2 is a perspective view of a step of attaching a current collector terminal plate to the electrode group of a secondary battery according to an embodiment of the present invention, showing a state before the current collector terminal plate is connected to the electrode group.
Figure 3:
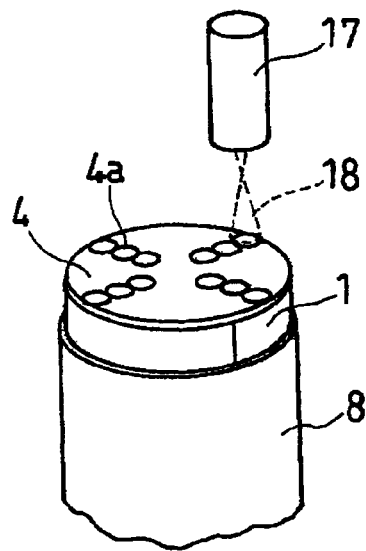
FIG. 3 is a perspective view of a step of attaching a current collector terminal plate to the electrode group of a secondary battery according to an embodiment of the present invention, showing a state after the current collector terminal plate has been connected to the electrode group.

FIGS. 2 and 3 show an example of a step of connecting the positive electrode current collector terminal plate 4 to the exposed portion of the positive electrode current collector 1. In the example shown here, the disc-shaped positive electrode current collector terminal plate 4 is abutted against the exposed portion of the positive electrode current collector 1 that protrudes on one end side of the electrode group 10, and the positive electrode current collector terminal plate 4 and the exposed portion of the positive electrode current collector 1 are welded at a plurality of locations by generating an arc 18 between a torch 17 and the positive electrode current collector terminal plate 4. Welding locations 4a are formed such that they are arranged radially on the positive electrode current collector terminal plate 4. In the example shown here, the positive electrode current collector terminal plate 4 and the exposed portion of the positive electrode current collector 1 are connected by arc welding, but the present invention is not limited thereto, and the positive electrode current collector terminal plate 4 and the exposed portion of the positive electrode current collector 1 may be welded by laser welding. A step of connecting the negative electrode current collector terminal plate 9 to the exposed portion of the negative electrode current collector 5 is also performed in the same manner.

Figure 4:
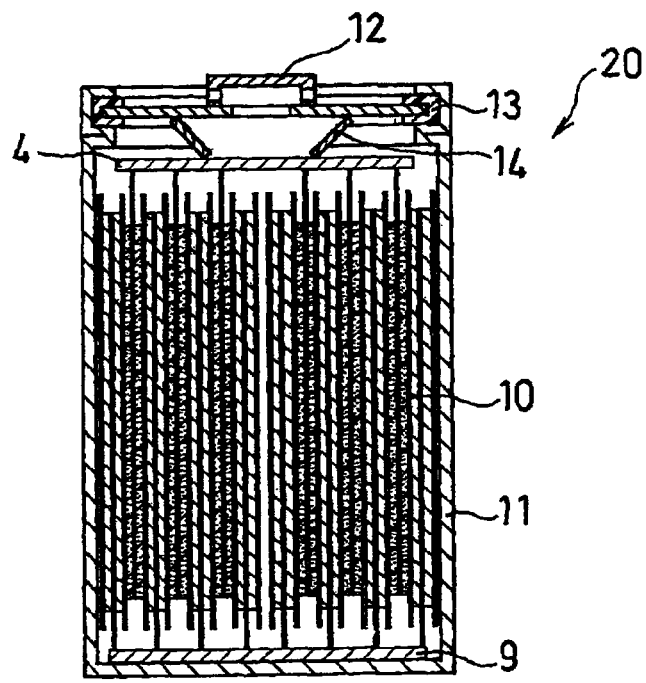
FIG. 4 is a vertical cross-sectional view of a secondary battery according to Embodiment 1 of the present invention.

FIG. 4 shows a secondary battery constructed by housing the current collector terminal plate-equipped electrode group 10 shown in FIG. 1 in a bottomed cylindrical battery case 11.

A secondary battery 20 of the example shown here is constructed by inserting the electrode group 10 into a battery case so as to bring the negative electrode current collector terminal plate 9 into contact with the bottom portion of the battery case 11, and installing a coned disc spring 14 made of a conductive material on the positive electrode current collector terminal plate 4. The coned disc spring 14 is disposed compressed between a sealing plate 12 that seals the opening portion of the battery case 11 and also serves as an external terminal and the positive electrode current collector terminal plate 4, whereby the coned disc spring 14 is in pressed contact with both the positive electrode current collector terminal plate 4 and the sealing plate 12 and electrically connects the positive electrode current collector terminal plate 4 and the sealing plate 12. A prescribed amount of non-aqueous electrolyte that is enclosed together with the electrode group 10 in the battery case 11 is not shown in the diagram.

The sealing plate 12 is equipped with a sealing gasket 13 in the peripheral portion. The opening of the battery case 11 is sealed by folding the opening edge of the battery case 11 inward so as to crimp onto the peripheral portion of the sealing plate 12 over the sealing gasket 13.

The coned disc spring 14 urges the current collector terminal plate-equipped electrode group 10 toward the bottom portion of the battery case 11 with the elastic force generated by compression, whereby the conductive state between the negative electrode current collector terminal plate 9 and the battery case 11 is secured.

Figure 5A:
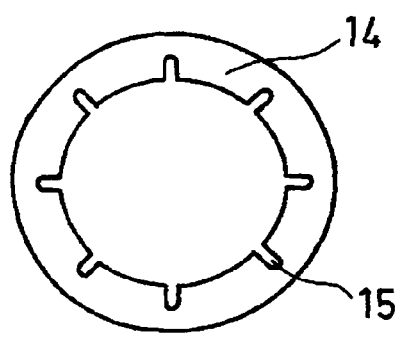
FIG. 5A is a plan view of a coned disc spring used in the secondary battery according to Embodiment 1.

FIGS. 5A and 5B show the coned disc spring 14 in detail. The coned disc spring 14 shown here is structured to have a dead zone in which the elastic force does not change according to the amount of deformation so that it can urge the current collector terminal plate-equipped electrode group 10 toward the bottom portion of the battery case 11 with a defined elastic force regardless of a deviation or change in the size of the electrode group 10 or the like.

More specifically, the coned disc spring 14 has a shape resembling a slightly deep dish without a bottom, or in other words, a short tubular shape that flares from one end side (the upper side of FIG. 5B) toward the other end side (the lower side of FIG. 5B). A plurality of (eight in the example shown here) slits 15 are formed in the minor diameter-side opening portion, or in other words, inner circumference portion, of the coned disc spring 14 at an equal pitch in the circumferential direction.

With this configuration, as shown in FIG. 6, a dead zone C in which the elastic force hardly changes even when the amount of deformation of the coned disc spring 14 changes appears in a characteristic curve representing the elastic force versus the amount of deformation of the coned disc spring 14.

By setting the natural length of the coned disc spring 14, the shape of the slit 15 and the like such that the electrode group 10 is urged by the coned disc spring 14 within the dead zone C region of the amount of deformation, it is possible to constantly press the electrode group 10 toward the bottom portion of the battery case 11 with a defined elastic force regardless of a deviation or change in the size of the electrode group 10 or the like, whereby it is possible to secure a stable conductive state between the positive electrode current collector terminal plate 4 and the sealing plate 12 and between the negative electrode current collector terminal plate 9 and the battery case 11.

For the material of the coned disc spring 14, a stainless steel, a carbon steel, a tool steel, a bainite steel, a phosphor bronze and the like can be used. In particular, a phosphor bronze is preferable. Also, it is preferable to cover the surface of such a material with a metal thin film that has high withstand voltage. For example, it is preferable to apply nickel plating and chromium plating to the surface of the coned disc spring 14, whereby the withstand voltage of the coned disc spring 14 are improved, as a result of which it is possible to prevent degradation of the coned disc spring 14 over time caused by the constantly applied voltage from accelerating.

It is preferable that a member that faces the coned disc spring 14 is provided with a positioning mechanism for positioning the coned disc spring 14 as shown in FIG. 7. The positioning mechanism of the example shown here is configured by providing a plurality of (four in the example shown here) positioning projections 16 that engage with the respective slits 15 of the coned disc spring 14 in a surface of the positive electrode current collector terminal plate 4 that faces the coned disc spring 14.

With the provision of such a positioning mechanism, it is possible to prevent the elastic force of the coned disc spring 14 from acting on a position offset from the axis of the electrode group 10 caused by the axis of the coned disc spring 14 being largely shifted to the right or left from the axis of the electrode group 10, whereby the conductive state between the power generating element and the external terminal of the secondary battery can be secured with more stability.

Figure 9:
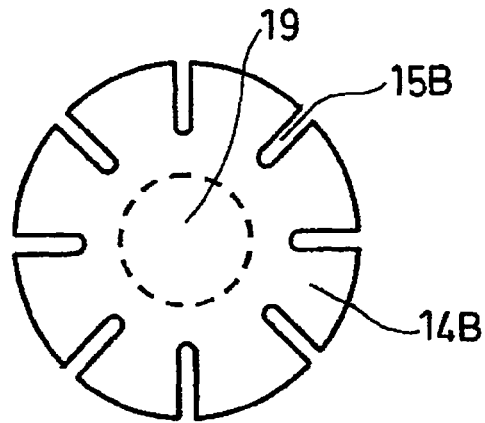
FIG. 9 is a plan view showing another variation of the coned disc spring according to Embodiment 1.
Figure 10:
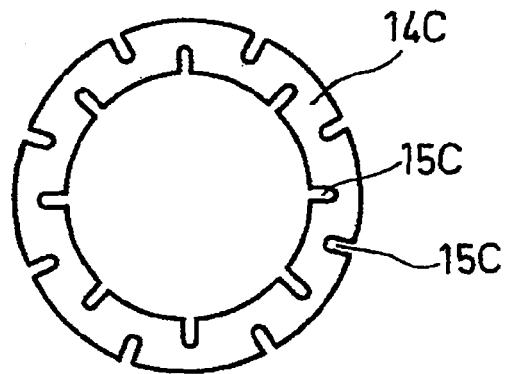
FIG. 10 is a plan view showing still another variation of the coned disc spring according to Embodiment 1.

FIGS. 8 to 10 show variations of the coned disc spring according to the present embodiment.

A coned disc spring 14A of FIG. 8 has a similar configuration as that of the coned disc spring 14 described above, and a plurality of (eight in the example shown here) slits 15A are provided in the major diameter-side opening portion, or in other words, outer circumference portion, of the coned disc spring 14A at an equal pitch.

A coned disc spring 14B of FIG. 9 has a dish-shape with a relatively small and shallow bottom portion 19, and a plurality of (eight in the example shown here) rather long slits 15B are formed in the outer circumference portion thereof at an equal pitch in the circumferential direction.

A coned disc spring 14C of FIG. 10 has a similar configuration as that of the coned disc springs 14 and 14A, and a plurality of (eight in the example shown here) slits 15C are provided at an equal pitch in both the outer circumference portion and the inner circumference portion thereof in equal numbers. The slits 15C are formed such that they are staggered in the outer circumference portion and the inner circumference portion of the coned disc spring 14C. By providing slits 15C in the outer circumference portion and the inner circumference portion as just described, and providing a plurality of positioning projections 16 in positions corresponding to the slits 15C of both the outer circumference portion and the inner circumference portion, the positioning projections 16 can be engaged with the slits 15C of both the outer circumference portion and the inner circumference portion, whereby the coned disc spring can be positioned with more accuracy.

It should be noted that the coned disc spring of the present invention is not limited to the examples given above, and it is possible to arbitrarily set the position, shape, size, number and the like of the slits so as to optimize the pressing force and the dead zone region according to the size of the secondary battery.

FIGS. 11 to 14 show variations of the secondary battery of the present embodiment.

Figure 11:
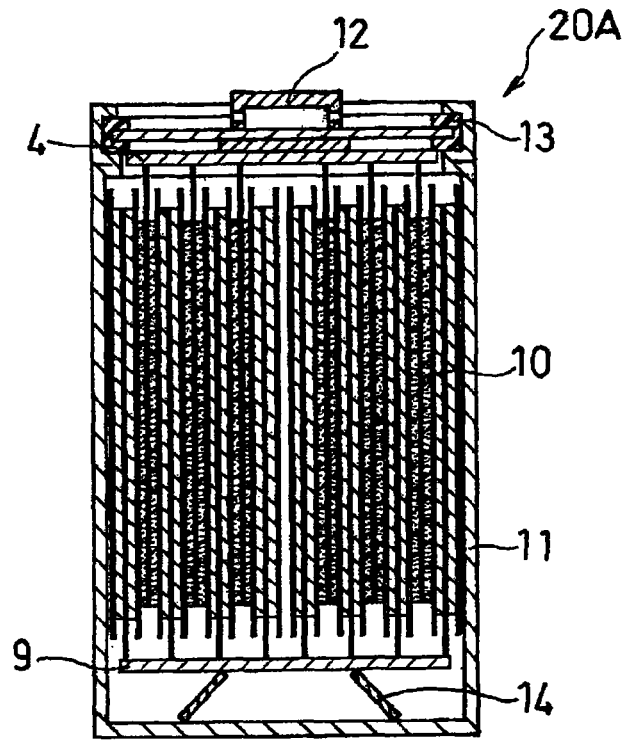
FIG. 11 is a vertical cross-sectional view showing a variation of the secondary battery according to Embodiment 1 of the present invention.

A secondary battery 20A of FIG. 11 is a battery in which any one of the coned disc springs 14 and 14A to 14C is disposed compressed between the negative electrode current collector terminal plate 9 and the bottom portion of the battery case 11. In this example, the positive electrode current collector terminal plate 4 and the sealing plate 12 are directly connected without the involvement of a coned disc spring.

Figure 12:
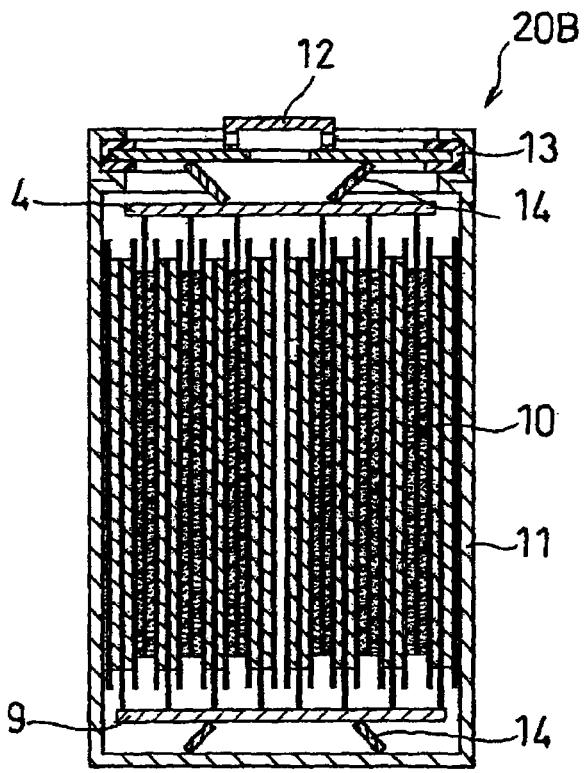
FIG. 12 is a vertical cross-sectional view showing another variation of the secondary battery according to Embodiment 1.

A secondary battery 20B of FIG. 12 is a battery in which any one of the coned disc springs 14 and 14A to 14C is disposed compressed both between the positive electrode current collector terminal plate 4 and the sealing plate 12 and between the negative electrode current collector terminal plate 9 and the bottom portion of the battery case 11.

Figure 13:
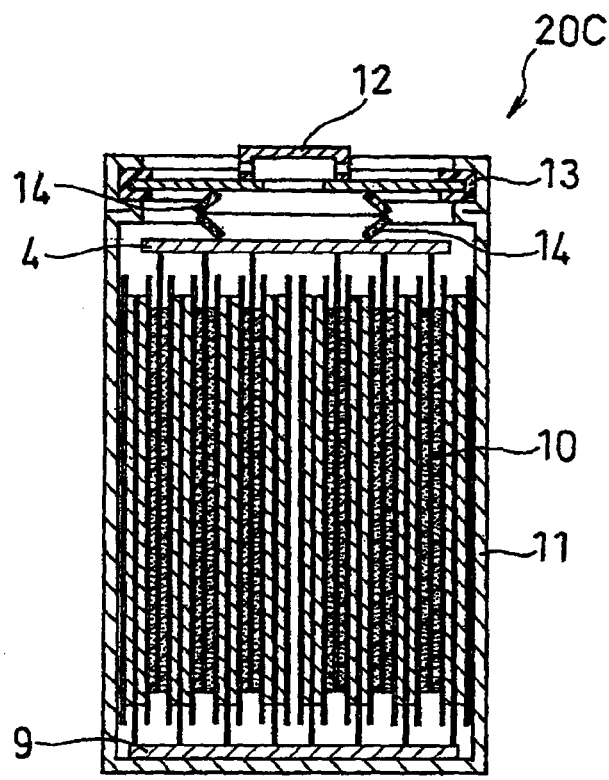
FIG. 13 is a vertical cross-sectional view showing still another variation of the secondary battery according to Embodiment 1.

A secondary battery 20C of FIG. 13 is a battery in which two of the coned disc springs 14 and 14A to 14C are disposed compressed between the positive electrode current collector terminal plate 4 and the sealing plate 12 such that the major diameter-side opening portions of the coned disc springs face each other. At this time, by forming the end surface of each of the facing major diameter-side opening portions in a surface perpendicular to the axis of the coned disc springs, positional offset between the coned disc springs can be prevented.

It is also possible to dispose two coned disc springs such that their minor diameter-side opening portions face each other. In this case, by forming the end surface of each of the facing minor diameter-side opening portions in a surface perpendicular to the axis of the coned disc springs, positional offset between the coned disc springs can be prevented.

That is, by disposing two coned disc springs of the same shape aligned in the stretch direction by causing the same diameter-side opening portions to face each other, two coned disc springs can be used in a stacked manner.

Figure 14:
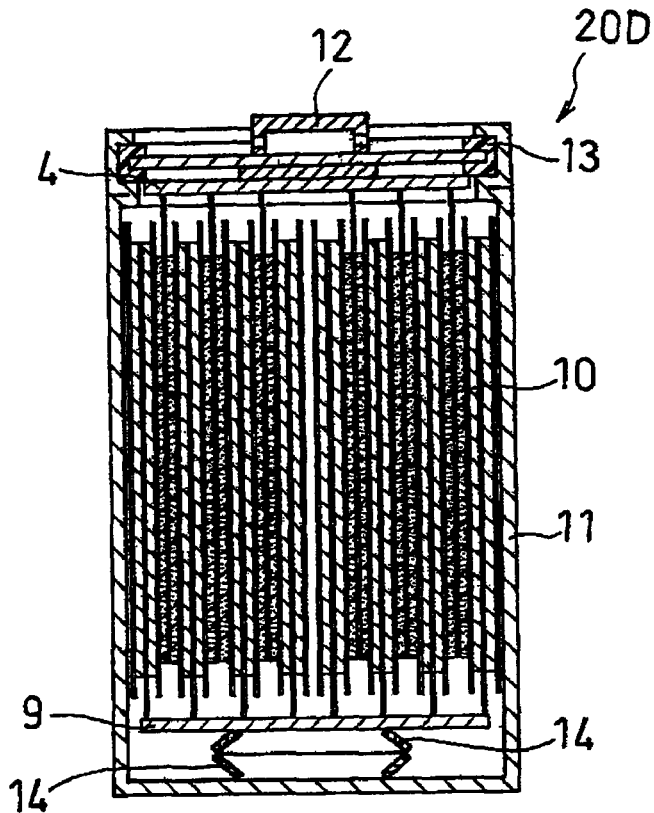
FIG. 14 is a vertical cross-sectional view showing still another variation of the secondary battery according to Embodiment 1.

A secondary battery 20D of FIG. 14 is a battery in which two of the coned disc springs 14 and 14A to 14C are disposed compressed between the negative electrode current collector terminal plate 9 and the bottom portion of the battery case 11 such that the major diameter-side opening portions of the coned disc springs face each other. At this time, by making each of the facing major diameter-side opening portions flat, positional offset between the coned disc springs can be prevented.

Hereinafter, examples of Embodiment 1 will be described. However, it should be noted that the present invention is not limited to the examples given below.

Example 1

First, a positive electrode coating material mixture was prepared by agitating and kneading 100 parts by weight of lithium cobalt oxide as a positive electrode active material, 2 parts by weight of acetylene black as a conductive material, 2 parts by weight of polyvinylidene fluoride as a binder and an appropriate amount of N-methyl-2-pyrrolidone with the use of a double arm kneader.

Next, the coating material mixture prepared above was applied onto both surfaces of a long strip-shaped positive electrode current collector made of a 15 μm thick aluminum foil and dried, whereby a precursor of a positive electrode plate with a positive electrode material mixture layer thickness of 100 μm on one surface was produced. The precursor was then pressed so as to have a total thickness of 165 μm. As a result, the material mixture layer thickness on one surface was reduced to 75 μm. Next, the pressed precursor was cut to a specified size so as to produce a positive electrode plate. A current collector exposed portion with a prescribed width was formed on one end side in the width direction of the produced positive electrode plate.

A negative electrode coating material mixture was prepared by agitating and kneading 100 parts by weight of artificial graphite as a negative electrode active material, 2.5 parts by weight (1 part by weight in terms of solids of the binder) of an aqueous dispersion of styrene-butadiene copolymer rubber particles (solids content: 40 wt %) as a binder, 1 part by weight of carboxymethyl cellulose as a thickener and an appropriate amount of water with the use of a double arm kneader.

Next, the coating material mixture prepared above was applied onto both surfaces of a long strip-shaped negative electrode current collector made of a 10 μm thick copper foil and dried, whereby a precursor of a negative electrode plate with a negative electrode material mixture layer thickness of 110 μm on one surface was produced. The precursor was then pressed so as to have a total thickness of 180 μm. As a result, the negative electrode material mixture layer thickness on one surface was reduced to 85 μm. Next, the pressed precursor was cut to a specified size so as to produce a negative electrode plate. A current collector exposed portion with a prescribed width was formed on one end side in the width direction of the produced negative electrode plate.

The positive electrode plate and the negative electrode plate produced in the above-described manner were spirally wound with a 20 μm thick separator interposed therebetween, and cut to a prescribed length to obtain an electrode group. Here, the electrode group was constructed such that the respective current collector exposed portions of the positive electrode plate and the negative electrode plate protruded on one end side and the other end side of the electrode group.

Then, a disc-shaped positive electrode current collector terminal plate was bonded, at a plurality of locations, to the positive electrode current collector exposed portion protruding on one end side of the electrode group by laser welding. Likewise, a disc-shaped negative electrode current collector terminal plate was bonded, at a plurality of locations, to the negative electrode current collector exposed portion protruding on the other end side of the electrode group by laser welding.

The electrode group to which the positive electrode current collector terminal plate and the negative electrode current collector terminal plate had been bonded (hereinafter referred to as a current collector terminal plate-equipped electrode group) was inserted into a bottomed cylindrical battery case and, after that, a prescribed amount of electrolyte (not shown) obtained by dissolving 1 M of $LiPF_6$ in a solvent mixture of ethylene carbonate (EC), dimethyl carbonate (DMC) and methyl ethyl carbonate (MEC) was injected into the battery case.

Next, a coned disc spring that had the same shape as that of the coned disc spring 14 shown in FIGS. 5A and 5B was placed on the positive electrode current collector terminal plate and, after that, the opening portion of the battery case was sealed with a sealing plate equipped with a gasket in the peripheral portion. The coned disc spring used here was made of a phosphor bronze and the surface thereof was nickel-plated.

The coned disc spring was positioned by engaging each of four positioning projections provided in a surface of the positive electrode current collector terminal plate that faces the sealing plate in a slit.

In the above manner, in Example 1, one hundred lithium ion secondary batteries were produced as secondary batteries for evaluation.

Example 2

First, a current collector terminal plate-equipped electrode group was produced in the same manner as in Example 1. In addition, a coned disc spring that had the same shape as that of the coned disc spring 14A shown in FIG. 8 was produced. The material, natural length and dead zone region of the amount of deformation of the coned disc spring were the same as those of the coned disc spring of Example 1.

Next, the coned disc spring was inserted into a battery case so as to bring the major diameter-side opening portion into contact with the bottom portion of the battery case. After that, the current collector terminal plate-equipped electrode group was inserted into the battery case so as to bring the negative electrode current collector terminal plate into contact with the minor diameter-side opening portion of the coned disc spring. After that, the same electrolyte as used in Example 1 was injected into the battery case. After that, a sealing plate equipped with a gasket in the peripheral portion was placed so as to bring it into contact with the positive electrode current collector terminal plate, and the opening portion of the battery case was sealed with the sealing plate in the same manner as in Example 1. In this manner, a lithium ion secondary battery was constructed in which the negative electrode current collector terminal plate and the battery case was connected via the compressed coned disc spring while the sealing plate and the positive electrode current collector terminal plate were connected by being brought into pressed contact by the elastic force of the coned disc spring.

In this example, the coned disc spring was positioned by engaging each of four positioning projections provided in a surface of the negative electrode current collector terminal plate that faced the bottom portion of the battery case in a slit.

In the above manner, one hundred lithium ion secondary batteries were produced as secondary batteries for evaluation.

Example 3

First, a current collector terminal plate-equipped electrode group was produced in the same manner as in Example 1. In addition, a first coned disc spring that had the same shape as that of the coned disc spring 14 shown in FIGS. 5A and 5B was produced. The material of the first coned disc spring was the same as that of the coned disc spring of Example 1. Also, a second coned disc spring that had the same shape as that of the coned disc spring 14A shown in FIG. 8 was produced. The material of the second coned disc spring was the same as that of the coned disc spring of Example 1.

Next, the second coned disc spring was inserted into a battery case so as to bring the major diameter-side opening portion into contact with the bottom portion of the battery. After that, the current collector terminal plate-equipped electrode group was inserted into the battery case so as to bring the negative electrode current collector terminal plate into contact with the minor diameter-side opening portion of the second coned disc spring. After that, the same electrolyte as used in Example 1 was injected into the battery case 11.

Next, the first coned disc spring was inserted into the battery case so as to bring the major diameter-side opening portion into contact with the positive electrode current collector terminal plate. After that, a sealing plate equipped with a gasket in the peripheral portion was placed so as to bring it into contact with the minor diameter-side opening portion of the first coned disc spring, and the opening portion of the battery case was sealed with the sealing plate in the same manner as in Example 1. In this manner, a lithium ion secondary battery was constructed in which the negative electrode current collector terminal plate and the battery case were connected via the compressed second coned disc spring while the sealing plate and the positive electrode current collector terminal plate were connected via the compressed first coned disc spring.

The first coned disc spring disposed between the sealing plate and the positive electrode current collector terminal plate was positioned by engaging each of four positioning projections provided in a surface of the positive electrode current collector terminal plate that faced the sealing plate in a slit. The second coned disc spring disposed between the negative electrode current collector terminal plate and the bottom portion of the battery case was positioned by engaging each of four positioning projections provided in a surface of the negative electrode current collector terminal plate that faced the bottom portion of the battery case in a slit.

In the above manner, one hundred lithium ion secondary batteries were produced as secondary batteries for evaluation.

Example 4

First, a current collector terminal plate-equipped electrode group was produced in the same manner as in Example 1. In addition, two coned disc springs that had the same shape as that of the coned disc spring 14 shown in FIGS. 5A and 5B were produced. The material, natural length and dead zone region of the coned disc springs were the same as those of the first coned disc spring of Embodiment 3. The end surface of the major diameter-side opening portion was formed to be a flat plane perpendicular to the axis.

Next, the current collector terminal plate-equipped electrode group was inserted into a battery case so as to bring the negative electrode current collector terminal plate into contact with the bottom portion. After that, the same electrolyte as used in Example 1 was injected into the battery case 11. After that, one of the coned disc springs was inserted into the battery case so as to bring the minor diameter-side opening portion into contact with the positive electrode current collector terminal plate.

Next, the other coned disc spring was inserted into the battery case so as to cause the major diameter-side opening portion to face the major diameter-side opening portion of the former coned disc spring. After that, a sealing plate equipped with a gasket in the peripheral portion was placed so as to bring it into contact with the minor diameter-side opening portion of the second coned disc spring, and the opening portion of the battery case was sealed with the sealing plate in the same manner as in Example 1. In this manner, a lithium ion secondary battery was constructed in which the negative electrode current collector terminal plate and the battery case were connected by being brought into direct contact with each other while the sealing plate and the positive electrode current collector terminal plate were connected via the two compressed coned disc springs.

The coned disc spring disposed in contact with the positive electrode current collector terminal plate was positioned by engaging each of four positioning projections provided in a surface of the positive electrode current collector terminal plate that faced the sealing plate in a slit. The coned disc spring disposed stacked on that coned disc spring was positioned by engaging each of four positioning projections provided on a surface of the sealing plate that faced the positive electrode current collector terminal plate in a slit.

In the above manner, in Example 4, one hundred lithium ion secondary batteries were produced as secondary batteries for evaluation.

Example 5

First, a current collector terminal plate-equipped electrode group was produced in the same manner as in Example 1. In addition, two coned disc springs that had the same shape as that of the coned disc spring 14 shown in FIGS. 5A and 5B were produced. The material, natural length and dead zone region of the coned disc springs were the same as those of the first coned disc spring of Embodiment 3. The end surface of the major diameter-side opening portion was formed so as to be a flat plane perpendicular to the axis.

Next, one of the coned disc springs was inserted into a battery case so as to bring the minor diameter-side opening portion into contact with the bottom portion of the battery case. After that, the other coned disc spring was inserted into the battery case so as to cause the major diameter-side opening portion to face the major diameter-side opening portion of the former coned disc spring. After that, the current collector terminal plate-equipped electrode group was inserted into the battery case so as to bring the negative electrode current collector terminal plate into contact with the minor diameter-side opening portion of the second coned disc spring.

After that, the same electrolyte as used in Example 1 was injected into the battery case 11. After that, a sealing plate equipped with a gasket in the peripheral portion was placed so as to bring it into contact with the positive electrode current collector terminal plate, and the opening portion of the battery case was sealed with the sealing plate in the same manner as in Example 1. In this manner, a lithium ion secondary battery was constructed in which the negative electrode current collector terminal plate and the battery case were connected via the two compressed coned disc springs while the sealing plate and the positive electrode current collector terminal plate were connected by being brought into direct contact with each other.

The coned disc spring disposed in contact with the negative electrode current collector terminal plate was positioned by engaging each of four positioning projections provided on a surface of the negative electrode current collector terminal plate that faced the bottom portion of the battery case in a slit. The coned disc spring disposed below that coned disc spring was positioned by engaging each of four positioning projections provided on a surface of the bottom portion of the battery case that faced the negative electrode current collector terminal plate in a slit.

In the above manner, in Example 5, one hundred lithium ion secondary batteries were produced as secondary batteries for evaluation.

Evaluation

One hundred secondary batteries of each of Examples 1 to 5 described above were subjected to initial charge and discharge twice and were left standing in an environment at 45° C. for seven days, and the internal resistance was measured. As a result, all of the batteries exhibited an internal resistance of about 10 mΩ, and no conduction failure was observed in the batteries.

Furthermore, those secondary batteries were subjected to, as an example of such evaluation, a cycle degradation evaluation in which a secondary battery was charged and discharged through 500 cycles, and when the capacity decreased by 50% or more, the battery was determined as having degraded. As a result, no secondary batteries were determined as having suffered cycle degradation. All of the secondary batteries that had been subjected to the cycle degradation evaluation were disassembled and the electrode groups were unwound to check whether or not deposition of lithium or separation of the electrode material mixture layer were observed. As a result, such defects were not observed.

The above results are presumably explained as follows. In Examples 1 to 5, one or two coned disc springs that had a dead zone in which the elastic force hardly changes in a prescribed region of the amount of deformation were used, and a conductive state was secured by the elastic force of the coned disc spring between the positive electrode current collector terminal plate and the sealing plate, or between the negative electrode current collector terminal plate and the bottom portion of the battery case.

With the use of such coned disc springs, even when variations or changes occur in the size of the electrode group or the like, the electrode group is constantly pressed by a defined elastic force, so it is possible to secure a conductive state between the positive electrode current collector terminal plate and the sealing plate, or between the negative electrode current collector terminal plate and the bottom portion of the battery case.

In Embodiment 1 and the examples described above, the coned disc spring was disposed such that the axis thereof was positioned in the center of the electrode group, but the present invention is not limited thereto. It is also possible to, for example, in the case of a large-format cylindrical secondary battery, arrange a plurality of coned disc springs in the circumferential direction of the electrode group.

Embodiment 2

Embodiment 2 of the present invention will be described next.

Figure 15:
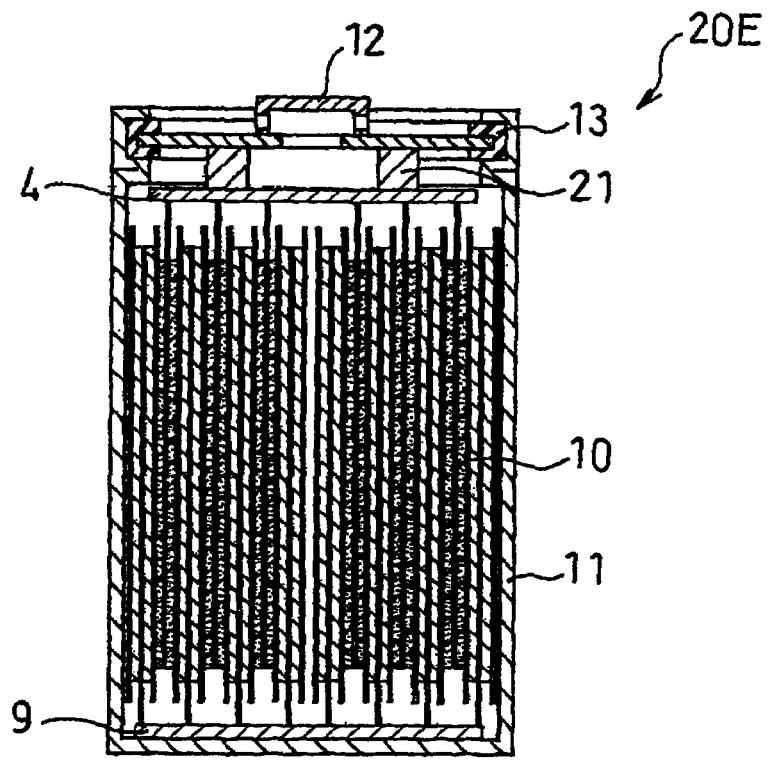
FIG. 15 is a vertical cross-sectional view of a secondary battery according to Embodiment 2 of the present invention.

FIG. 15 shows a schematic configuration of a secondary battery according to Embodiment 2 of the present invention. A secondary battery 20E of the example shown here is constructed by disposing a conduction cutoff member 21 made of a ring-shaped non-woven fabric of conductive fiber between the positive electrode current collector terminal plate 4 and the sealing plate 12 such that one end surface of the conduction cutoff member 21 comes into contact with the positive electrode current collector terminal plate 4 and the other end surface comes into contact with the sealing plate 12.

With this configuration, the positive electrode current collector terminal plate 4 and the sealing plate 12 are connected via the conduction cutoff member 21 under normal conditions, whereas when a short circuit occurs and the temperature of the conduction cutoff member 21 increases to a high temperature, the fibers of the conduction cutoff member 21 are softened or melted and lose their elasticity, making it unable to maintain the conductive state between the members sandwiching the conduction cutoff member 21, as a result of which the current therebetween is cut off. With this configuration, it is possible to eliminate the possibility that the secondary battery might undergo thermal runaway due to an internal short circuit or the like. Accordingly, the safety of the secondary battery is improved.

The non-woven fabric that constitutes the conduction cutoff member 21 can be made of a resin fiber coated with a metal on the surface thereof. The resin is preferably polyethylene or polypropylene. Other usable examples include a thermoplastic resin or synthetic rubber that is resistant to electrolytes, and a thermal deformation starting temperature or melting point of 100 to 170° C., and preferably 110 to 150° C.

It is preferable that the coating applied to the surface of such a non-woven fabric is gold plating with a small electrical resistance. However, any coating is possible as long as it is a conductive metal coating, and for example, nickel plating may be applied.

Figure 16:
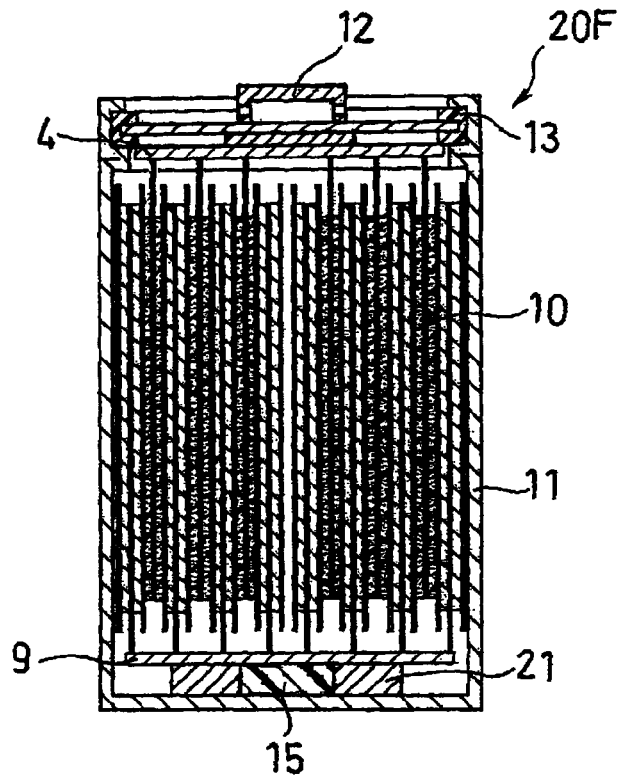
FIG. 16 is a vertical cross-sectional view showing a variation of the secondary battery according to Embodiment 2.
Figure 17:
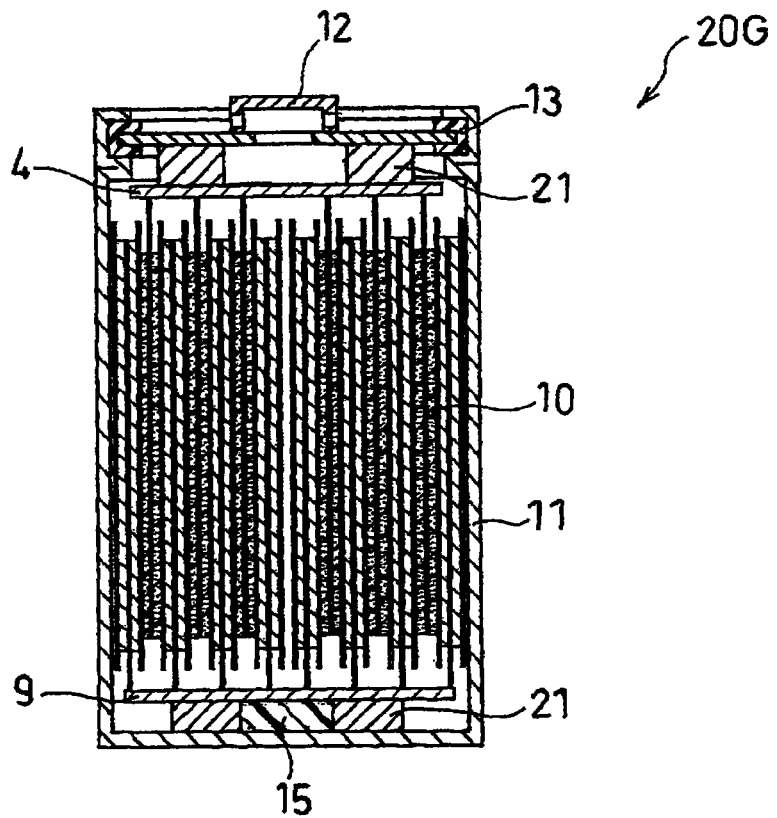
FIG. 17 is a vertical cross-sectional view showing another variation of the secondary battery according to Embodiment 2.

FIGS. 16 and 17 show variations of Embodiment 2.

In a secondary battery 20F shown in FIG. 16, a ring-shaped conduction cutoff member 21 made of a conductive non-woven fabric is disposed between the negative electrode current collector terminal plate 9 and the bottom portion of the battery case 11 so as to bring one end surface of the conduction cutoff member 21 into contact with the negative electrode current collector terminal plate 9 and the other end surface into contact with the bottom portion of the battery case 11. In a hollow portion of the ring-shaped conduction cutoff member 21, a disc-shaped insulator 15 for positioning the conduction cutoff member 21 is disposed. The thickness of the insulator 15 is smaller than the thickness of the conduction cutoff member 21.

In a secondary battery 20G shown in FIG. 17, a conduction cutoff member 21 is disposed both between the positive electrode current collector terminal plate 4 and the sealing plate 12 and between the negative electrode current collector terminal plate 9 and the bottom portion of the battery case 11. In a hollow portion of the conduction cutoff member 21 disposed between the negative electrode current collector terminal plate 9 and the bottom portion of the battery case 11, a disc-shaped insulator 15 for positioning is disposed.

Hereinafter, examples of Embodiment 2 will be described. However, it should be noted that the present invention is not limited to the examples given below.

Example 6

First, a current collector terminal plate-equipped electrode group was produced in the same manner as in Example 1. In addition, a gold-plated polyethylene fiber was formed into a 2 mm thick ring-shaped member so as to produce a conduction cutoff member.

Next, the current collector terminal plate-equipped electrode group was inserted into a battery case so as to bring the negative electrode current collector terminal plate into contact with the bottom portion. After that, the same electrolyte as used in Example 1 was injected into the battery case. After that, the conduction cutoff member was inserted into the battery case so as to bring it into contact with the positive electrode current collector terminal plate. After that, a sealing plate equipped with a gasket in the peripheral portion was placed so as to bring it into contact with the conduction cutoff member, and the opening portion of the battery case was sealed with the sealing plate in the same manner as in Example 1. In this manner, a lithium ion secondary battery was constructed in which the positive electrode current collector terminal plate and the sealing plate were connected via the conduction cutoff member while the negative electrode current collector terminal plate and the bottom portion of the battery case were connected by being brought into direct contact with each other.

One hundred lithium ion secondary batteries were produced in the above-described manner for evaluation.

Example 7

First, a current collector terminal plate-equipped electrode group was produced in the same manner as in Example 1. In addition, a gold-plated polyethylene fiber was formed into a 2 mm thick ring-shaped member so as to produce a conduction cutoff member. Then, a disc-shaped polytetrafluoroethylene insulator was inserted in a hollow portion of the conduction cutoff member.

Next, the conduction cutoff member was inserted into a battery case so as to bring it into contact with the bottom portion of the battery case. After that, the current collector terminal plate-equipped electrode group was inserted into the battery case so as to bring the negative electrode current collector terminal plate into contact with the conduction cutoff member. After that, the same electrolyte as used in Example 1 was injected into the battery case. After that, a sealing plate equipped with a gasket in the peripheral portion was placed so as to bring it into contact with the positive electrode current collector terminal plate, and the opening portion of the battery case was sealed with the sealing plate in the same manner as in Example 1. In this manner, a lithium ion secondary battery was constructed in which the positive electrode current collector terminal plate and the sealing plate were connected by being brought into direct contact with each other while the negative electrode current collector terminal plate and the bottom portion of the battery case were connected via the conduction cutoff member.

One hundred lithium ion secondary batteries were produced in the above-described manner for evaluation.

Example 8

First, a current collector terminal plate-equipped electrode group was produced in the same manner as in Example 1. In addition, a gold-plated polyethylene fiber was formed into a 2 mm thick ring-shaped member so as to produce a conduction cutoff member. Then, a disc-shaped polytetrafluoroethylene insulator was inserted in a hollow portion of the conduction cutoff member.

Next, the conduction cutoff member was inserted into a battery case so as to bring it into contact with the bottom portion. After that, the current collector terminal plate-equipped electrode group was inserted into the battery case so as to bring the negative electrode current collector terminal plate into contact with the conduction cutoff member. After that, the same electrolyte as used in Example 1 was injected into the battery case. After that, another conduction cutoff member produced as described above was inserted into the battery case so as to bring it into contact with the positive electrode current collector terminal plate. After that, a sealing plate equipped with a gasket in the peripheral portion was placed so as to bring it into contact with the positive electrode current collector terminal plate, and the opening portion of the battery case was sealed with the sealing plate in the same manner as in Example 1. In this manner, a lithium ion secondary battery was constructed in which the positive electrode current collector terminal plate and the sealing plate, and the negative electrode current collector terminal plate and the bottom portion of the battery case were connected via the respective conduction cutoff members.

One hundred lithium ion secondary batteries were produced in the above-described manner for evaluation.
Evaluation One hundred secondary batteries of each of Examples 6 to 8 described above were subjected to a test in which a secondary battery was subjected to initial charge and discharge twice and was left standing in an environment at 45° C. for seven days, and the internal resistance was measured. As a result, all of the batteries exhibited an internal resistance of about 10 mΩ, and no conduction failure was observed in the batteries.

Furthermore, ten batteries were extracted from the secondary batteries that had been subjected to internal resistance measurement, and the extracted secondary batteries were subjected to a cycle degradation evaluation. More specifically, as an example of such evaluation, a cycle degradation evaluation was performed in which a secondary battery was charged and discharged through 500 cycles, and the evaluation was made by using a criterion of whether the capacity decreased by 50% or more. As a result, no secondary batteries were determined as having suffered cycle degradation. All of the secondary batteries that had been subjected to the cycle degradation evaluation were disassembled and the electrode groups were unwound to check whether or not deposition of lithium or separation of the electrode material mixture layer were observed, as a result of which there were no secondary batteries in which such defects had occurred.

Furthermore, another ten batteries were extracted from the secondary batteries that had been subjected to internal resistance measurement, and the extracted secondary batteries were subjected to a test in which a secondary battery was stored in an environment at 110° C. for two hours, and the voltage was then measured. As a result, a voltage was hardly detected in any of the secondary batteries. The results prove that when the secondary battery temperature rises above a prescribed temperature, the current no longer flows through the conduction cutoff member made of a conductive nonwoven fabric, and the current between the power generating element and the external terminal is cut off.

More specifically, the polyethylene in the form of fibers of the conduction cutoff member 21 melted in high temperature conditions at 110° C. and lost its spring-like properties, making it unable to maintain conductive contact, as a result of which the current was cut off.

Embodiment 3

Embodiment 3 of the present invention will be described next.

Figure 18:
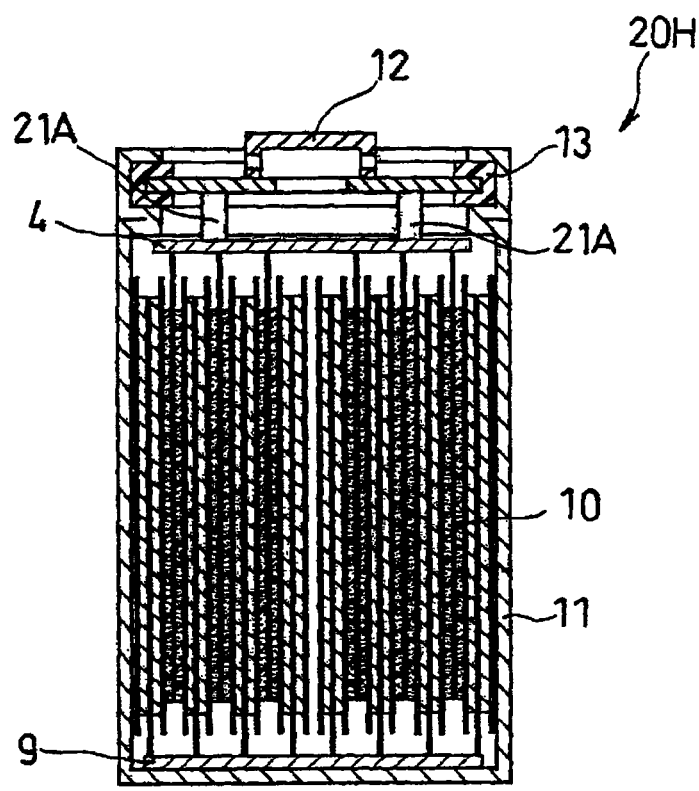
FIG. 18 is a vertical cross-sectional view of a secondary battery according to Embodiment 3 of the present invention.

In a secondary battery 20H shown in FIG. 18, a plurality of (e.g., three or more) conduction cutoff members 21A that were configured of elements made of a shape memory alloy are disposed between the sealing plate 12 and the positive electrode current collector terminal plate 4.

Figure 19:
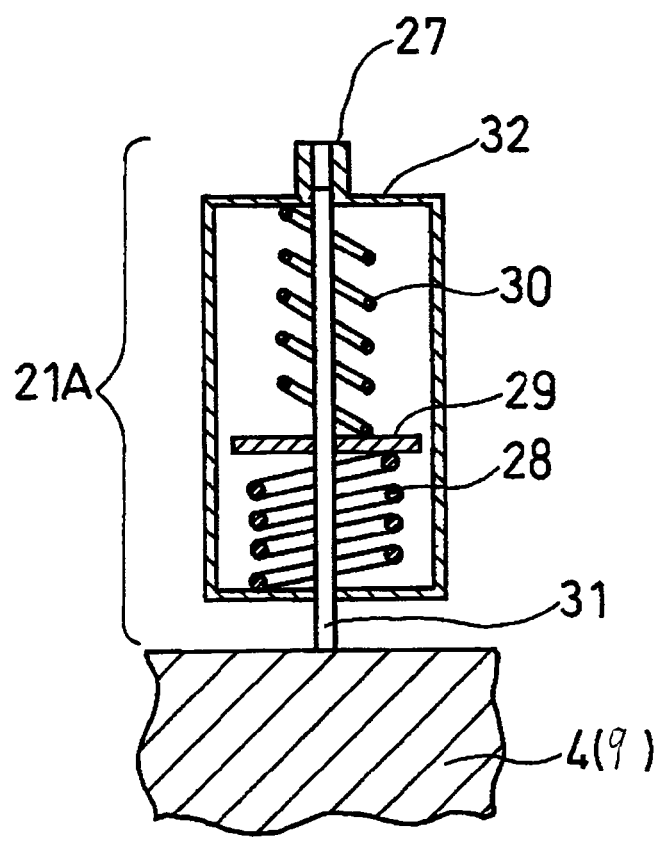
FIG. 19 is a vertical cross-sectional view of a conduction cutoff member used in the secondary battery according to Embodiment 3, showing an operational state at room temperature.
Figure 20:
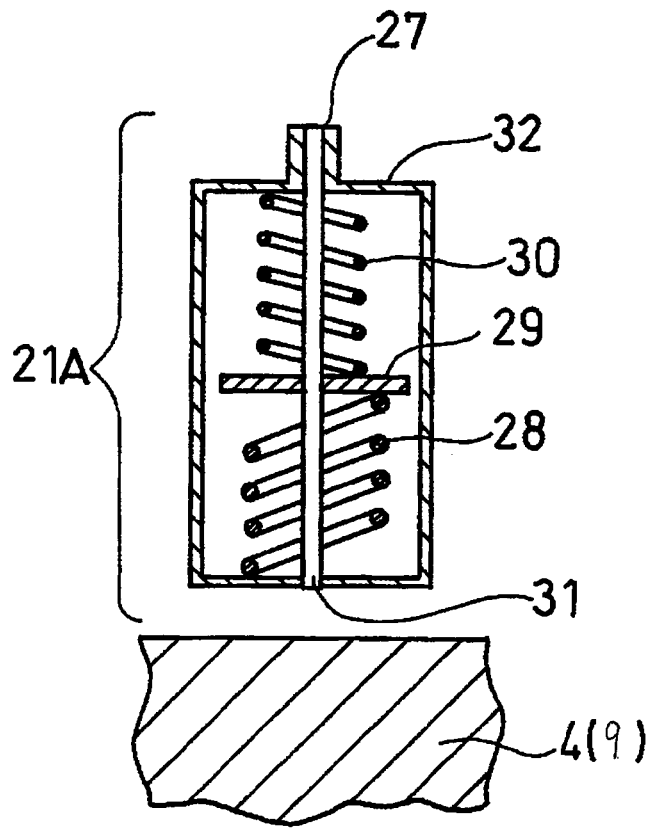
FIG. 20 is a vertical cross-sectional view of the conduction cutoff member according to Embodiment 3, showing an operational state in a high temperature condition.

FIGS. 19 and 20 show a conduction cutoff member 21A in detail. The conduction cutoff member 21A of the example shown here is constructed by housing a primary spring 28 configured of a coil spring made of a shape memory alloy, a bias spring 30 configured of an ordinary metal coil spring, and a terminal rod 31 in a metal case 32 made of aluminum or the like. The primary spring 28 and the bias spring 30 are disposed aligned in a stretch direction.

The primary spring 28 is made of a bidirectional shape memory alloy such as, for example, an alloy of titanium and nickel. The terminal rod 31 is supported so as to be capable of displacement in the axial direction by a pipe-like rod insertion portion 27 formed on one end side of the case 32 and a rod insertion aperture (not shown) provided on the other end side of the case 32.

A force receiving plate 29 disposed between the primary spring 28 and the bias spring 30 is fixed to the terminal rod 31, and the terminal rod 31 moves in the axial direction such that the forces from the respective springs received by the force receiving plate 29 balance.

FIG. 19 shows an operational state of the conduction cutoff member 21A when the temperature of the secondary battery is room temperature. In this operational state, the primary spring 28 changes in shape such that the natural length of the primary spring 28 becomes short, whereby the terminal rod 31 is moved in the direction of the positive electrode current collector terminal plate 4 (or negative electrode current collector terminal plate 9), and one end portion of the terminal rod 31 comes into contact with the positive electrode current collector terminal plate 4 (or negative electrode current collector terminal plate 9). At this time, the other end portion of the terminal rod 31 is connected to the sealing plate via the rod insertion portion 27. Thus, the positive electrode current collector terminal plate 4 and the sealing plate 12 are connected via the conduction cutoff member 21A.

FIG. 20 shows an operational state of the conduction cutoff member 21A when the temperature of the secondary battery 2 reaches a high temperature (e.g., a temperature of 100° C. or higher). In this operational state, the primary spring 28 changes in shape such that the natural length of the primary spring 28 becomes long, whereby the terminal rod 31 is spaced apart from the positive electrode current collector terminal plate 4. Thus, the electrical connection between the positive electrode current collector terminal plate 4 and the sealing plate 12 is cut off.

FIGS. 21 to 24 show a variation of Embodiment 3. A conduction cutoff member 21B of this variation is a diaphragm-type element constructed by attaching a thin film 38 made of a shape memory alloy to a substrate 36 made of a conductive circular film. As the substrate 36, a film in which a conductive thin film has been formed on a polyimide or an aluminum foil can be used. As the shape memory alloy, a bidirectional shape memory alloy is used.

Figure 21:
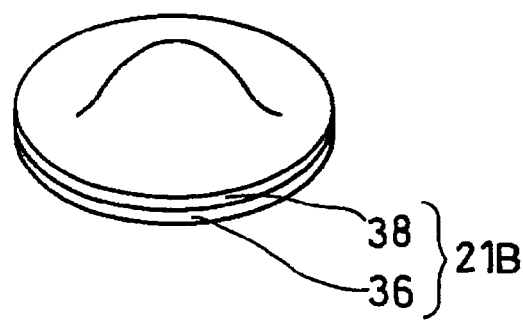
FIG. 21 is a perspective view of a variation of the conduction cutoff member according to Embodiment 3, showing an operational state at room temperature.
Figure 22:
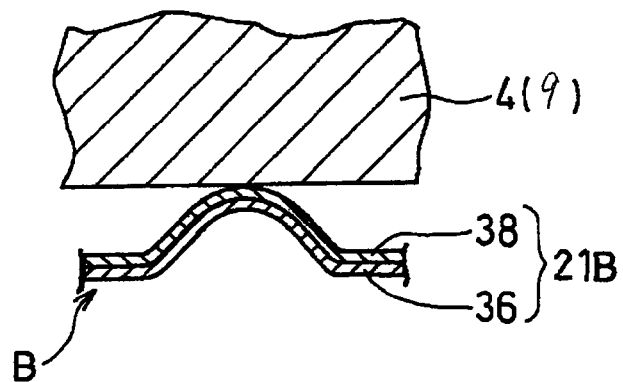
FIG. 22 is a cross-sectional view of a variation of the conduction cutoff member according to Embodiment 3, showing an operational state at room temperature.

FIGS. 21 and 22 show an operational state of the conduction cutoff member 21B when the temperature of the secondary battery is room temperature. In this operational state, a center portion of the thin film 38 is shaped into a bulge shape, whereby the conduction cutoff member 21B comes into contact with both the positive electrode current collector terminal plate 4 and the sealing plate 12. Thus, the positive electrode current collector terminal plate 4 and the sealing plate 12 are connected via the conduction cutoff member 21B.

Figure 23:
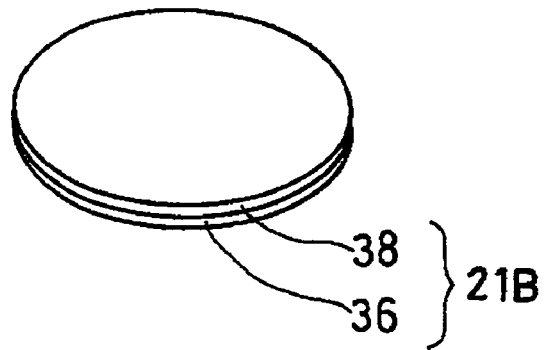
FIG. 23 is a perspective view of a variation of the conduction cutoff member according to Embodiment 3, showing an operational state in a high temperature condition.
Figure 24:
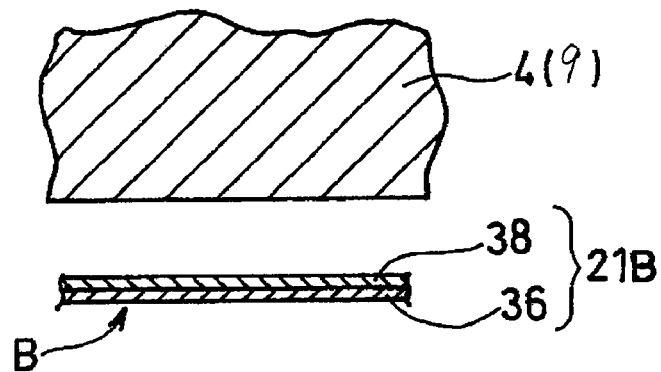
FIG. 24 is a cross-sectional view of a variation of the conduction cutoff member according to Embodiment 3, showing an operational state in a high temperature condition.

FIGS. 23 and 24 show an operational state of the conduction cutoff member 21B when the temperature of the secondary battery reaches a high temperature (e.g., a temperature of 100° C. or higher). In this operational state, the thin film 38 flattens, whereby the conduction cutoff member 21B is no longer in contact with the sealing plate 12. Thus, the current between the positive electrode current collector terminal plate 4 and the sealing plate 12 is cut off.

Figure 25:
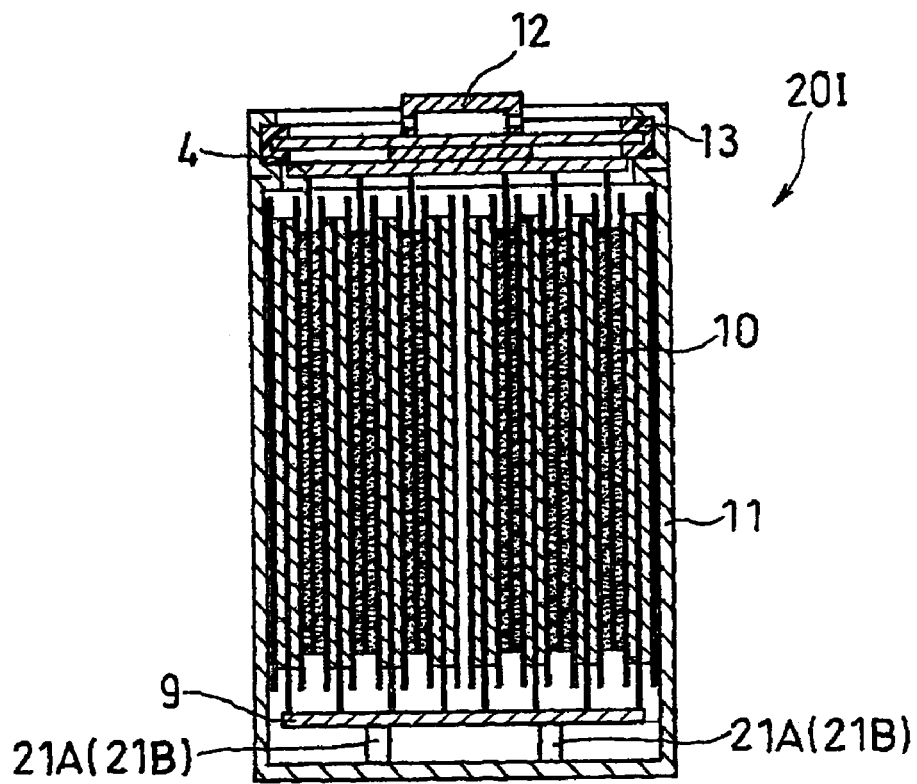
FIG. 25 is a vertical cross-sectional view showing a variation of the secondary battery according to Embodiment 3 of the present invention.
Figure 26:
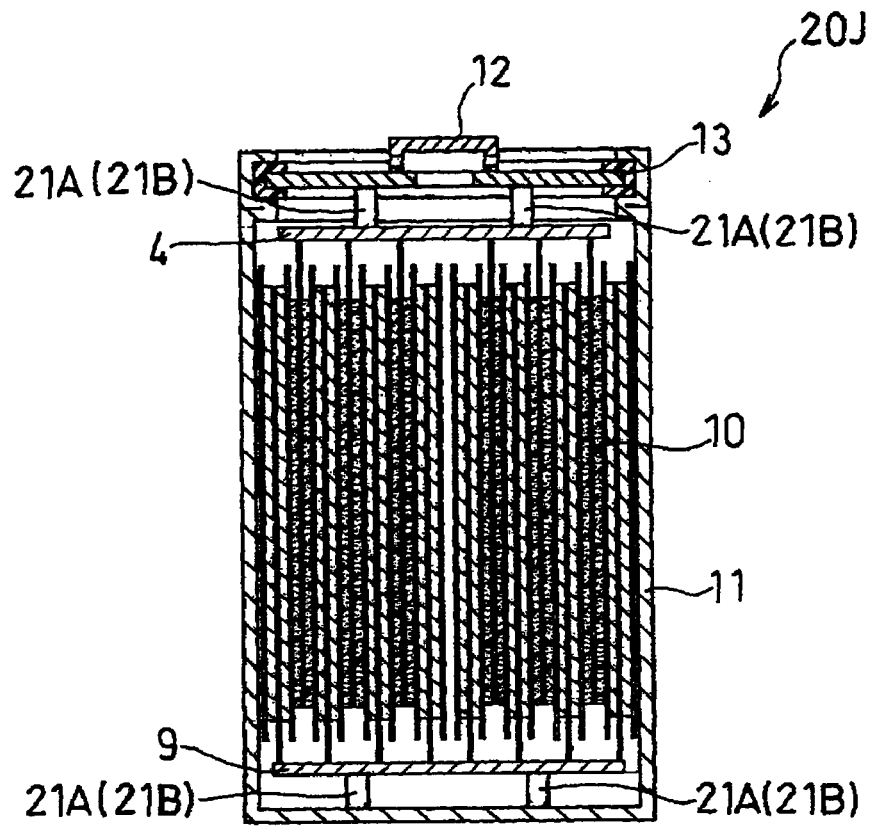
FIG. 26 is a vertical cross-sectional view showing another variation of the secondary battery according to Embodiment 3.

FIGS. 25 and 26 show other variations of Embodiment 3.

In a secondary battery 20I shown in FIG. 25, either of the conduction cutoff members 21A and 21B described above is disposed between the negative electrode current collector terminal plate 9 and the bottom portion of the battery case 11. In a secondary battery 20J shown in FIG. 26, either of the conduction cutoff members 21A and 21B described above is disposed between the positive electrode current collector terminal plate 4 and the sealing plate 12 and between the negative electrode current collector terminal plate 9 and the bottom portion of the battery case 11.

Hereinafter, examples of Embodiment 3 will be described. However, it should be noted that the present invention is not limited to the examples given below.

Example 9

First, a current collector terminal plate-equipped electrode group was produced in the same manner as in Example 1. In addition, conduction cutoff members that had the same structure as that of the conduction cutoff member shown in FIGS. 19 and 20 were produced. As the shape memory alloy constituting the primary spring, an alloy of titanium and nickel was used.

Next, the current collector terminal plate-equipped electrode group was inserted into a battery case so as to bring the negative electrode current collector terminal plate into contact with the bottom portion of the battery case. After that, the same electrolyte as used in Example 1 was injected into the battery case. After that, four conduction cutoff members produced as described above were inserted into the battery case so as to bring one end portion of the terminal rod into contact with the positive electrode current collector terminal plate. After that, a sealing plate equipped with a gasket in the peripheral portion was placed so as to bring it into contact with the rod insertion portion, and the opening portion of the battery case was sealed with the sealing plate in the same manner as in Example 1. In this manner, a lithium ion secondary battery was constructed in which the positive electrode current collector terminal plate and the sealing plate were connected via the conduction cutoff members while the negative electrode current collector terminal plate and the battery case were connected by being brought into direct contact with each other.

One hundred lithium ion secondary batteries were produced in the above-described manner for evaluation.

Example 10

First, a current collector terminal plate-equipped electrode group was produced in the same manner as in Example 1. In addition, conduction cutoff members that had the same structure as that of the conduction cutoff member shown in FIGS. 19 and 20 were produced. As the shape memory alloy constituting the primary spring, an alloy of titanium and nickel was used.

Next, four conduction cutoff members produced as described above were inserted into a battery case, with the rod insertion portions positioned on the bottom side, so as to bring the rod insertion portions into contact with the bottom portion of the battery case. After that, the current collector terminal plate-equipped electrode group was inserted into the battery case so as to bring the negative electrode current collector terminal plate into contact with one end portion of the terminal rod of the conduction cutoff members. After that, the same electrolyte as used in Example 1 was injected into the battery case. After that, a sealing plate equipped with a gasket in the peripheral portion was placed so as to bring it into contact with the positive electrode current collector terminal plate, and the opening portion of the battery case was sealed with the sealing plate in the same manner as in Example 1. In this manner, a lithium ion secondary battery was constructed in which the positive electrode current collector terminal plate and the sealing plate were connected by being brought into direct contact with each other while the negative electrode current collector terminal plate and the battery case were connected via the conduction cutoff members.

One hundred lithium ion secondary batteries were produced in the above-described manner for evaluation.

Example 11

First, a current collector terminal plate-equipped electrode group was produced in the same manner as in Example 1. In addition, first conduction cutoff members that had the same structure as that of the conduction cutoff member shown in FIGS. 21 to 24 were produced. As the shape memory alloy constituting the thin film, an alloy of titanium and nickel was used. Second conduction cutoff members that had the same structure as that of the conduction cutoff member shown in FIGS. 19 and 20 were also produced. As the shape memory alloy constituting the primary spring, an alloy of titanium and nickel was used.

Next, four first conduction cutoff members produced as described above were inserted into a battery case, with the bulges of the thin films positioned on the opening side, so as to bring the substrates and the bottom portion of the battery case into contact with each other. After that, the current collector terminal plate-equipped electrode group was inserted into the battery case so as to bring the negative electrode current collector terminal plate into contact with the bulges of the thin films of the first conduction cutoff members. After that, the same electrolyte as used in Example 1 was injected into the battery case. After that, four second conduction cutoff members produced as described above were inserted into the battery case, with the rod insertion portions positioned on the opening side, so as to bring one end portion of the terminal rods into contact with the positive electrode current collector terminal plate. After that, a sealing plate equipped with a gasket in the peripheral portion was placed so as to bring it into contact with the rod insertion portions of the second conduction cutoff members, and the opening portion of the battery case was sealed with the sealing plate in the same manner as in Example 1. In this manner, a lithium ion secondary battery was constructed in which the positive electrode current collector terminal plate and the sealing plate were connected via the second conduction cutoff members while the negative electrode current collector terminal plate and the battery case were connected via the first conduction cutoff member.

One hundred lithium ion secondary batteries were produced in the above-described manner for evaluation.
Evaluation One hundred secondary batteries of each of Examples 9 to 11 described above were subjected to a test in which a secondary battery was subjected to initial charge and discharge twice and was left standing in an environment at 45° C. for seven days, and the internal resistance was measured. As a result, all of the batteries exhibited an internal resistance of about 10 mΩ, and no conduction failure was observed in the batteries.

Furthermore, ten batteries were extracted from the secondary batteries that had been subjected to internal resistance measurement, and the extracted secondary batteries were subjected to a cycle degradation evaluation. More specifically, as an example of such evaluation, a cycle degradation evaluation was performed in which a secondary battery was charged and discharged for 500 cycles, and the evaluation was made by using a criterion of whether the capacity decreased by 50% or more. As a result, no secondary batteries were determined as having suffered cycle degradation. All of the secondary batteries that had been subjected to the cycle degradation evaluation were disassembled and the electrode groups were unwound to check whether or not deposition of lithium or separation of the electrode material mixture layer were observed, as a result of which there were no secondary batteries in which such defects had occurred.

Furthermore, another ten batteries were extracted from the secondary batteries that had been subjected to internal resistance measurement, the extracted secondary batteries were stored in an environment at 110° C. for two hours, and the terminal-to-terminal voltage was then measured. As a result, a voltage was hardly detected in any of the secondary batteries. Subsequently, the lithium ion secondary batteries were left standing until the battery temperature returned to room temperature, and the terminal-to-terminal voltage was then measured. As a result, all of the secondary batteries were restored to the initial voltage, and exhibited an internal resistance of around 10 mΩ.

The results prove that, in high temperature conditions at 110° C., the first and second conduction cutoff members operated so as to cut off the current between the power generating element and the external terminal of the secondary battery. It is also proved that when the secondary battery temperature returned to room temperature, the first and second conduction cutoff members operated so as to electrically connect the power generating element and the external terminal of the secondary battery.

To describe it more specifically, in Example 9, it is presumed that because the primary spring made of a shape memory alloy deformed to increase its natural length in high temperature conditions at 110° C., the total length of the conduction cutoff member was reduced, as a result of which the current between the positive electrode current collector terminal plate and the sealing plate was cut off. On the other hand, in room temperature conditions, it is presumed that because the total length of the conduction cutoff member returned to the original length, the positive electrode current collector terminal plate and the sealing plate were electrically connected.

In Example 10, it is presumed that because the primary spring made of a shape memory alloy deformed to increase its natural length in high temperature conditions at 110° C., the total length of the conduction cutoff member was reduced, as a result of which the current between the negative electrode current collector terminal plate and the battery case was cut off. On the other hand, in room temperature conditions, it is presumed that because the total length of the conduction cutoff member returned to the original length, the negative electrode current collector terminal plate and the battery case were electrically connected.

In Example 11, it is presumed that because the thin film made of a shape memory alloy deformed to reduce the thickness in high temperature conditions at 110° C., the current between the power generating element and the external terminal was cut off. Also, because the primary spring made of a shape memory alloy deformed to increase its natural length in high temperature conditions at 110° C., the total length of the conduction cutoff member was reduced, as a result of which the current between the positive electrode current collector terminal plate and the sealing plate was cut off.

On the other hand, in room temperature conditions, it is presumed that because the thin film made of a shape memory alloy deformed to increase the thickness, the power generating element and the external terminal were electrically connected. In addition, in room temperature conditions, because the total length of the conduction cutoff member returned to the original length, the positive electrode current collector terminal plate and the sealing plate were electrically connected.

Embodiment 4

Figure 27:
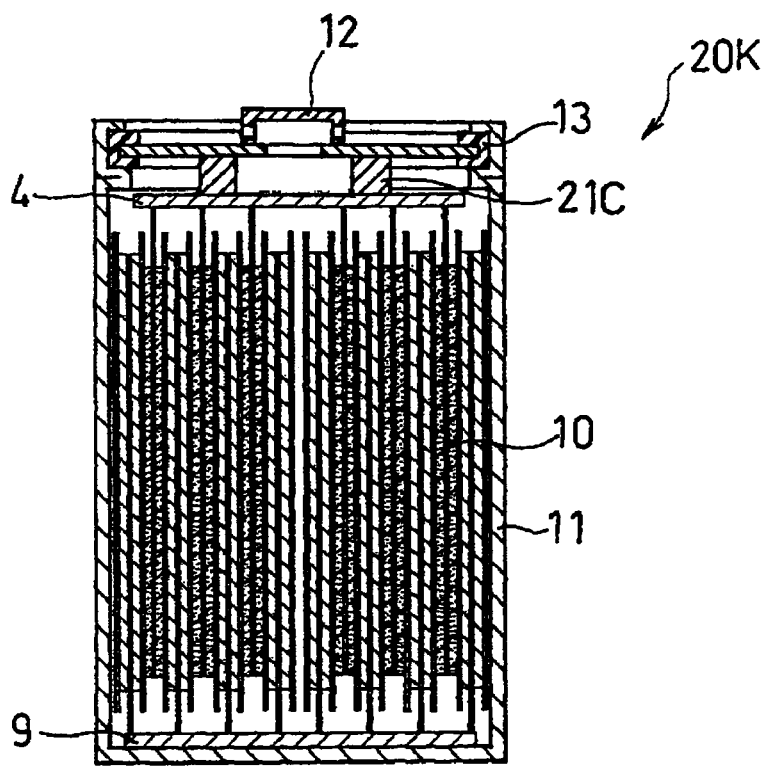
FIG. 27 is a vertical cross-sectional view of a secondary battery according to Embodiment 4 of the present invention.

Embodiment 4 of the present invention will be described next. FIG. 27 shows a secondary battery according to Embodiment 4 of the present invention. A secondary battery 20K of the example shown here is constructed by disposing a conduction cutoff member 21C made of a ring-shaped anisotropic conductive material between the positive electrode current collector terminal plate 4 and the sealing plate 12.

The ring-shaped conduction cutoff member 21C is structured to conduct electricity only in the height direction (thickness direction) and not conduct electricity in the width direction (diameter direction), and one end surface is in contact with the positive electrode current collector terminal plate 4 and the other end surface is in contact with the sealing plate 12, whereby the positive electrode current collector terminal plate 4 and the sealing plate 12 are connected.

To describe it more specifically, the anisotropic conductive material constituting the conduction cutoff member 21C can be obtained by dispersing a conductive filler made of metal nuclei, or a conductive filler made of metal-plated resin nuclei in a resin binder.

As the metal nuclei constituting such a conductive filler, a metal in the form of particles or fibers can be used. When a conductive filler is constituted from a simple metal substance, it is preferable to use nickel with superior withstand voltage. In order to reduce the resistance value, it is also possible to apply gold plating or the like on the surface of metal nuclei.

When the conductive filler contains resin nuclei, the surface of the resin nuclei can be plated with a metal so as to impart conductivity. It is preferable that the metal plating is gold plating from the viewpoint of reducing the resistance value. Furthermore, it is preferable that the material of the resin nuclei and the material of the binder are a thermoplastic resin or synthetic rubber that is resistant to electrolytes, and a thermal deformation temperature or melting point of 100 to 170° C., and preferably 110 to 150° C.

Figure 28:
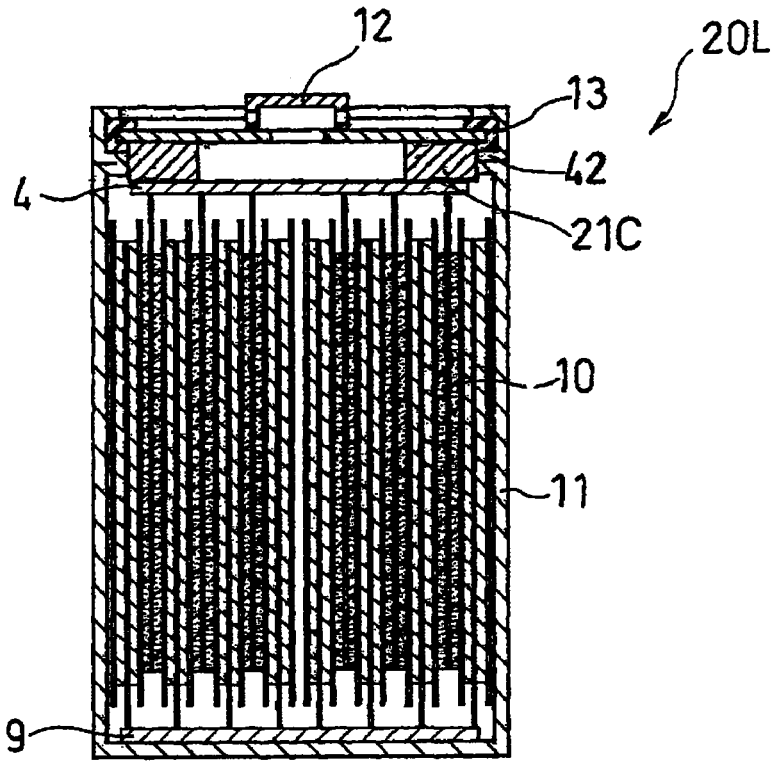
FIG. 28 is a vertical cross-sectional view showing a variation of the secondary battery according to Embodiment 4.
Figure 29:
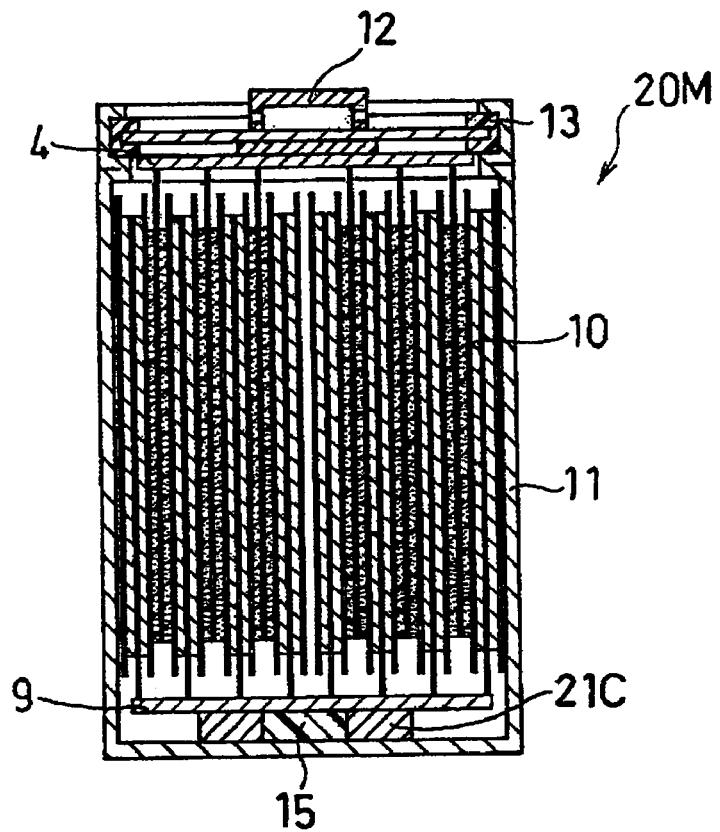
FIG. 29 is a vertical cross-sectional view showing another variation of the secondary battery according to Embodiment 4.
Figure 30:
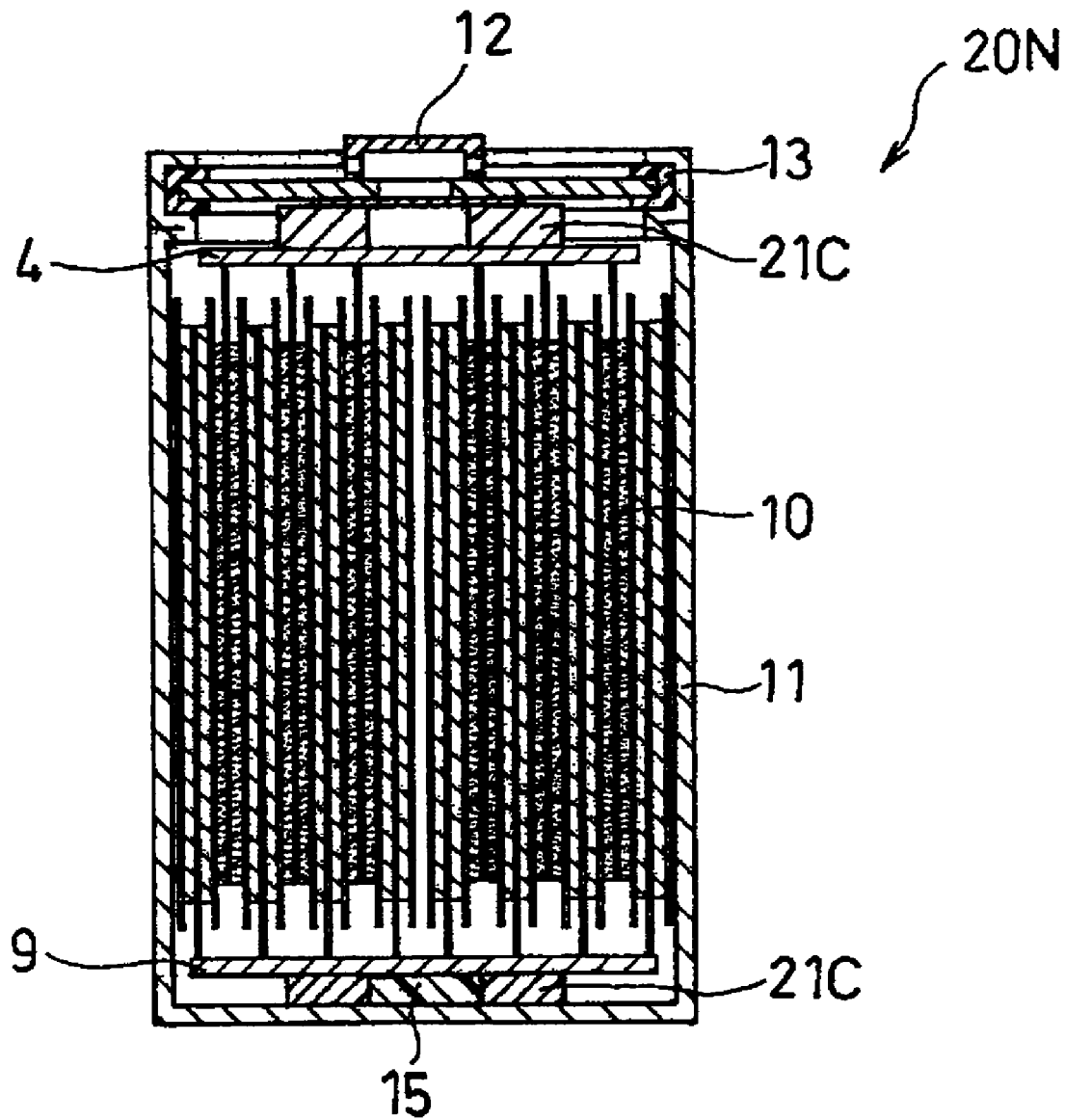
FIG. 30 is a vertical cross-sectional view showing still another variation of the secondary battery according to Embodiment 4.
Figure 31:
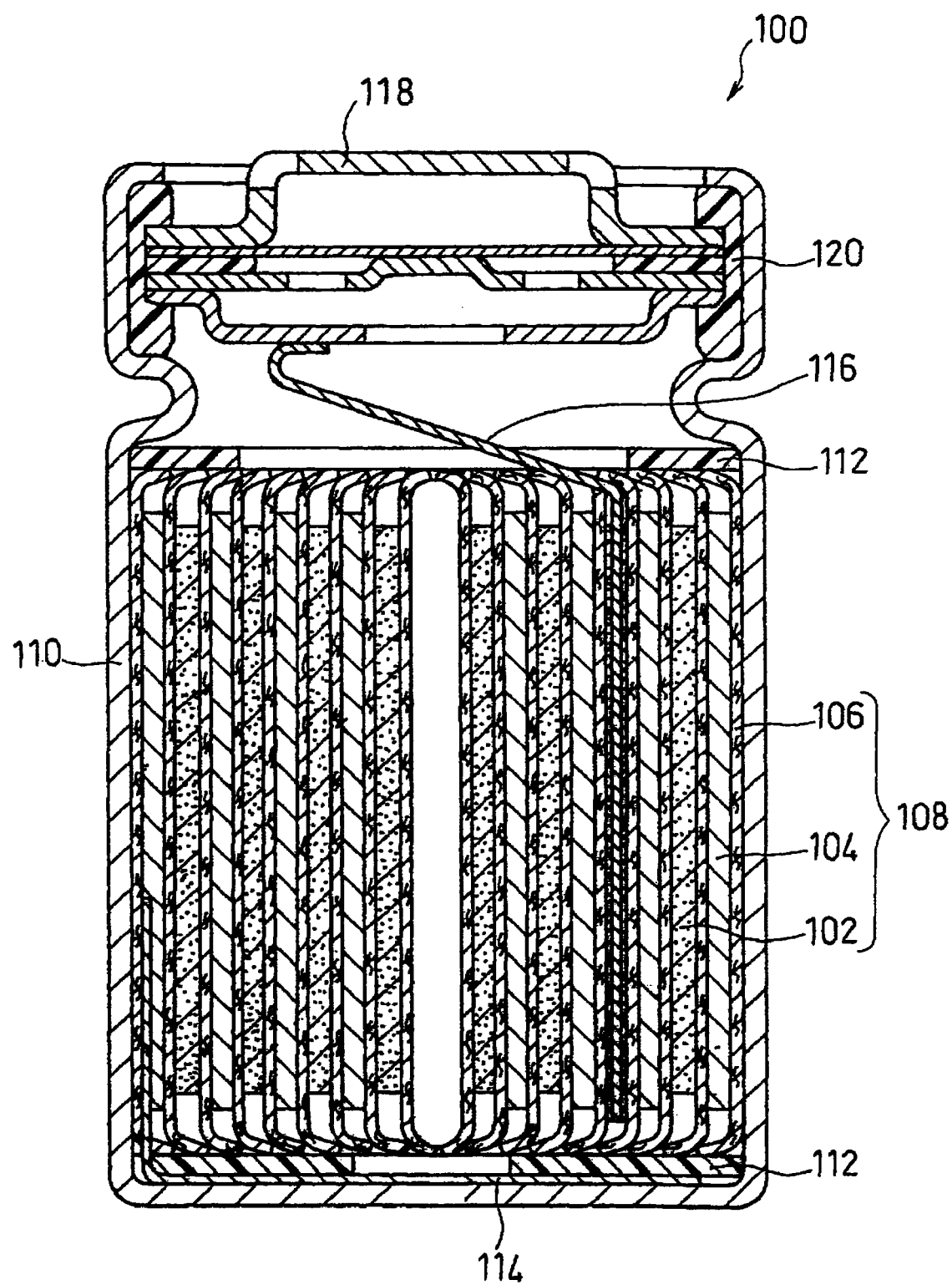
FIG. 31 is a vertical cross-sectional view of a conventional secondary battery.

FIGS. 28 to 30 show variations of Embodiment 4. In a secondary battery 20L shown in FIG. 28, a ring-shaped conduction cutoff member 21C made of an anisotropic conductive material is positioned by abutting the outer circumference portion of the conduction cutoff member 21C against a narrow portion 42 provided near the opening portion of the battery case 11. As used herein, the narrow portion 42 is a portion provided slightly downward from the opening edge of the battery case 11 so that the opening edge can be folded inward to crimp onto the peripheral portion of the sealing plate 12 over the gasket 13. That is, the sealing plate 12 is fixed to the opening portion of the battery case 11 by the peripheral portion of the sealing plate 12 sandwiched between the narrow portion 42 and the folded opening edge wall of the battery case 11.

Because the ring-shaped conduction cutoff member 21C conducts electricity only in the thickness direction and does not conduct electricity in the diameter direction, the ring-shaped conduction cutoff member 21C can be positioned by abutting the outer circumference portion against the inner circumference surface of the battery case 11 in the manner described above. In addition, by abutting the conduction cutoff member 21C against the narrow portion 42, the sealing property of the battery case 11 by the sealing plate 12 is also improved, and the possibility of the occurrence of electrolyte leakage is further reduced.

A secondary battery 20M shown in FIG. 29 is constructed by disposing the conduction cutoff member 21C made of an anisotropic conductive material between the negative electrode current collector terminal plate 9 and the bottom portion of the battery case 11. The conduction cutoff member 21C is in contact with the negative electrode current collector terminal plate 9 at one end surface and with the battery case 11 at the other end surface, whereby the negative electrode current collector terminal plate 9 and the battery case 11 are connected.

By disposing the conduction cutoff member 21C between the negative electrode current collector terminal plate 9 and the bottom portion of the battery case 11 as just described, the structure near the sealing portion of the battery case 11 of the secondary battery can be simplified, whereby an increase in the capacity of the secondary battery can be achieved.

A secondary battery 20N shown in FIG. 30 is constructed by disposing the conduction cutoff member 21C made of an anisotropic conductive material both between the positive electrode current collector terminal plate 4 and the sealing plate 12 and between the negative electrode current collector terminal plate 9 and the bottom portion of the battery case 11.

The conduction cutoff member 21C on the opening portion side of the battery case 11 is in contact with the positive electrode current collector terminal plate 4 at one end surface and with the sealing plate 12 at the other end surface, whereby the positive electrode current collector terminal plate 4 and the sealing plate 12 are connected. Likewise, the conduction cutoff member 21C on the bottom portion side of the battery case 11 is in contact with the negative electrode current collector terminal plate 9 at one end surface and with the bottom portion of the battery case 11 at the other end surface, whereby the negative electrode current collector terminal plate 9 and the battery case 11 are connected.

By disposing the conduction cutoff member 21C both between the positive electrode current collector terminal plate 4 and the sealing plate 12 and between the negative electrode current collector terminal plate 9 and the bottom portion of the battery case 11 as just described, the current between the power generating element and the external terminal of the secondary battery can be cut off more reliably when the temperature of the secondary battery rises excessively, whereby the safety of the secondary battery can be further improved.

The above embodiment has been described by taking, as an example, a configuration in which at least one of the resin nuclei of the conductive filler and the binder that are contained in the anisotropic conductive material is softened or melted by heat, whereby the conduction cutoff member 21C cuts off the current, but the configuration is not limited thereto. It is also possible to, for example, cause at least one of the resin nuclei and the binder to foam or contract by heat so that conductivity is lost.

In addition, in each of FIGS. 27 to 30 showing the above embodiment, a ring-shaped member was used alone as an anisotropic conductive material, but the present invention is not limited to the above manner, and any manner is acceptable as long as it enables uniform contact between the positive electrode current collector terminal plate 4 and the sealing plate 12 and between the negative electrode current collector terminal plate 9 and the battery case 11, respectively. For example, it is also possible to use a ring-shaped rubber elastic body in which a plurality of cylindrical anisotropic conductive materials have been embedded, a ring-shaped resin holder in which a plurality of cylindrical anisotropic conductive materials have been embedded, a plurality of cylindrical anisotropic conductive materials that have been joined with a resin joining material, or the like.

Hereinafter, examples of Embodiment 4 will be described. However, it should be noted that the present invention is not limited to the examples given below.

Example 12

First, a current collector terminal plate-equipped electrode group was produced in the same manner as in Example 1. In addition, a conduction cutoff member made of a 2 mm thick ring-shaped anisotropic conductive material was produced by dispersing a conductive filler made of gold-plated polystyrene nuclei in a polyester binder.

Next, the current collector terminal plate-equipped electrode group was inserted into a battery case so as to bring the negative electrode current collector terminal plate into contact with the bottom portion. After that, the same electrolyte as used in Example 1 was injected into the battery case. After that, the conduction cutoff member was inserted into the battery case so as to bring one end surface into contact with the positive electrode current collector terminal plate. After that, a sealing plate equipped with a gasket in the peripheral portion was placed so as to bring it into contact with the other end surface of the conduction cutoff member, and the opening portion of the battery case was sealed with the sealing plate in the same manner as in Example 1. In this manner, a lithium ion secondary battery was constructed in which the positive electrode current collector terminal plate and the sealing plate were connected via the conduction cutoff member, and the negative electrode current collector terminal plate and the battery case were connected by being brought into direct contact with each other.

One hundred lithium ion secondary batteries were produced in the above-described manner for evaluation.

Example 13

First, a current collector terminal plate-equipped electrode group was produced in the same manner as in Example 1. In addition, a conduction cutoff member made of a 2 mm thick ring-shaped anisotropic conductive material was produced by dispersing a conductive filler made of gold-plated polymethyl methacrylate nuclei in a polyamide binder. In this example, the outer diameter of the conduction cutoff member was configured so as to be capable of being abutted against a narrow portion for sealing the opening portion of the battery case by crimping onto the peripheral portion of the sealing plate.

Next, the current collector terminal plate-equipped electrode group was inserted into a battery case so as to bring the negative electrode current collector terminal plate into contact with the bottom portion. After that, the same electrolyte as used in Example 1 was injected into the battery case. After that, the conduction cutoff member was inserted into the battery case so as to bring one end surface into contact with the positive electrode current collector terminal plate. After that, a sealing plate equipped with a gasket in the peripheral portion was placed so as to bring it into contact with the other end surface of the conduction cutoff member and bring the narrow portion into contact with the outer circumference portion of the conduction cutoff member, and the opening portion of the battery case was sealed with the sealing plate in the same manner as in Example 1. In this manner, a lithium ion secondary battery was constructed in which the positive electrode current collector terminal plate and the sealing plate were connected via the conduction cutoff member, and the negative electrode current collector terminal plate and the battery case were connected by being brought into direct contact with each other.

One hundred lithium ion secondary batteries were produced in the above-described manner for evaluation.

Example 14

First, a current collector terminal plate-equipped electrode group was produced in the same manner as in Example 1. In addition, a conduction cutoff member made of a 2 mm thick ring-shaped anisotropic conductive material was produced by dispersing a conductive filler made of gold-plated nickel nuclei in a polyethylene binder. Then, a disc-shaped polytetrafluoroethylene insulator was inserted in a hollow portion of the ring-shaped conduction cutoff member.

Next, the conduction cutoff member was inserted into a battery case so as to bring one end surface into contact with the bottom portion of the battery case. After that, the current collector terminal plate-equipped electrode group was inserted into the battery case so as to bring the negative electrode current collector terminal plate into contact with the other end surface of the conduction cutoff member. After that, the same electrolyte as used in Example 1 was injected into the battery case. After that, a sealing plate equipped with a gasket in the peripheral portion was placed so as to bring it into contact with the positive electrode current collector terminal plate, and the sealing plate and the opening portion of the battery case was laser-sealed. In this manner, a lithium ion secondary battery was constructed in which the positive electrode current collector terminal plate and the sealing plate were connected by being brought into direct contact with each other, and the negative electrode current collector terminal plate and the battery case were connected via the conduction cutoff member.

One hundred lithium ion secondary batteries were produced in the above-described manner for evaluation.

Example 15

First, a current collector terminal plate-equipped electrode group was produced in the same manner as in Example 1. In addition, a first conduction cutoff member made of a 2 mm thick ring-shaped anisotropic conductive material was produced by dispersing a conductive filler made of gold-plated polymethyl methacrylate nuclei in a polyamide binder. In this example, the outer diameter of the conduction cutoff member was configured so as to be capable of being abutted against a narrow portion for sealing the opening portion of the battery case by crimping onto the peripheral portion of the sealing plate. Furthermore, a second conduction cutoff member made of a 2 mm thick ring-shaped anisotropic conductive material was produced by dispersing a conductive filler made of gold-plated nickel nuclei in a polyethylene binder. Then, a disc-shaped polytetrafluoroethylene insulator was inserted in a hollow portion of the ring-shaped second conduction cutoff member.

Next, the second conduction cutoff member was inserted into a battery case so as to bring one end surface into contact with the bottom portion of the battery case. After that, the current collector terminal plate-equipped electrode group was inserted into the battery case so as to bring the negative electrode current collector terminal plate into contact with the other end surface of the conduction cutoff member. After that, the same electrolyte as used in Example 1 was injected into the battery case.

Next, the first conduction cutoff member was inserted into the battery case so as to bring one end surface into contact with the positive electrode current collector terminal plate. After that, a sealing plate equipped with a gasket in the peripheral portion was placed so as to bring it into contact with the other end surface of the first conduction cutoff member, and the opening portion of the battery case was sealed with the sealing plate in the same manner as in Example 1. In this manner, a lithium ion secondary battery was constructed in which the positive electrode current collector terminal plate and the sealing plate were connected via the first conduction cutoff member, and the negative electrode current collector terminal plate and the battery case were connected with the second conduction cutoff member.

One hundred lithium ion secondary batteries were produced in the above-described manner for evaluation.

Evaluation

One hundred secondary batteries of each of Examples 12 to 15 described above were subjected to a test in which a secondary battery was subjected to initial charge and discharge twice and was left standing in an environment at 45° C. for seven days, and the internal resistance was measured. As a result, all of the batteries exhibited an internal resistance of about 10 mΩ, and no conduction failure was observed in the batteries.

Furthermore, ten batteries were extracted from the secondary batteries that had been subjected to internal resistance measurement, and the extracted secondary batteries were subjected to a cycle degradation evaluation. More specifically, as an example of such evaluation, a cycle degradation evaluation was performed in which a secondary battery was charged and discharged through 500 cycles, and the evaluation was made by using a criterion of whether the capacity decreased by 50% or more. As a result, no secondary batteries were determined as having suffered cycle degradation. All of the secondary batteries that had been subjected to the cycle degradation evaluation were disassembled and the electrode groups were unwound to check whether or not deposition of lithium or the separation of an electrode material mixture layer were observed, as a result of which there were no secondary batteries in which such defects had occurred.

Furthermore, another ten batteries were extracted from the secondary batteries that had been subjected to internal resistance measurement, the extracted secondary batteries were stored in an environment at 110° C. for two hours, and the terminal-to-terminal voltage was then measured. As a result, a voltage was hardly detected in any of the secondary batteries.

The results prove that, in each of Examples 12 to 15, the conduction cutoff member operated properly and cut off the current between the power generating element and the external terminal of the secondary battery.

To describe it more specifically, in Example 12, it is presumed that the polystyrene nuclei contained in the anisotropic conductive material thermally deformed in high temperature conditions at 110° C., making it unable to secure conductive contact between conductive filler particles, as a result of which the current was cut off.

In Example 13, it is presumed that the polymethyl methacrylate nuclei contained in the anisotropic conductive material thermally deformed in high temperature conditions at 110° C., making it unable to secure conductive contact between conductive filler particles, as a result of which the current was cut off.

In Example 14, it is presumed that the polyethylene contained in the anisotropic conductive material melted in high temperature conditions at 110° C., making it unable to secure conductive contact between nickel nuclei as a conductive filler, as a result of which the current was cut off.

In Example 15, it is presumed that the polymethyl methacrylate nuclei contained in the anisotropic conductive material thermally deformed in high temperature conditions at 110° C., making it unable to secure contact between conductive filler particles, and the polyethylene contained in another anisotropic conductive material melted, making it unable to secure conductive contact between nickel nuclei as a conductive filler, as a result of which the current was cut off.

INDUSTRIAL APPLICABILITY

With the secondary battery according to the present invention, it is possible to stabilize the conductive state between a current collector terminal plate and the battery case or the sealing plate while achieving a simple battery structure by eliminating a current collector lead, whereby a highly reliable non-aqueous secondary battery can be obtained. It is also possible to prevent thermal runaway caused by an internal short circuit or the like. Accordingly, the secondary battery of the present invention is useful as a power source for devices that are highly resistant to vibration and impact and require a large current such as a cordless electric tool, a power assisted bicycle and a hybrid automobile.

The invention claimed is:

1. A secondary battery comprising:
    an electrode group that includes a positive electrode plate and a negative electrode plate that are constructed by forming a material mixture layer made of an electrode material mixture that contains an active material on one surface or both surfaces of a strip-shaped current collector, and forming an exposed portion in which a surface of said current collector is exposed in one end portion in a width direction of said current collector, and a separator that is interposed between said positive electrode plate and said negative electrode plate, said electrode group being constructed by spirally winding or laminating said positive electrode plate, said negative electrode plate and said separator;
    a positive electrode current collector terminal plate that is disposed on one end side of said electrode group and is connected to said current collector exposed portion of said positive electrode plate;
    a negative electrode current collector terminal plate that is disposed on the other end side of said electrode group and is connected to said current collector exposed portion of said negative electrode plate;
    an electrolyte;
    a battery case that has a bottom portion and an opening portion disposed opposite to said bottom portion, is connected to one of said positive electrode current collector terminal plate and said negative electrode current collector terminal plate, and houses said electrode group, said positive electrode current collector terminal plate, said negative electrode current collector terminal plate and said electrolyte;
    a sealing plate that is connected to the other of said positive electrode current collector terminal plate and said negative electrode current collector terminal plate and seals the opening portion in an insulated state from said battery case; and
    one or more elastic members that have conductivity, are disposed at least one of between said the bottom portion of said battery case and one of said current collector terminal plates and between said sealing plate and the other of said current collector terminal plates, electrically connect members that sandwich the elastic member, bias said electrode group toward said bottom portion of said battery case or said sealing plate, have a dead zone in which an elastic force does not fluctuate according to an amount of deformation in a range from a first predetermined amount X to a second predetermined amount Y, wherein 0<x<Y, and are compressed upon installation to the extent that the amount of deformation is within said dead zone.

2. The secondary battery in accordance with claim 1, wherein said elastic member is configured of a coned disc spring that has a slit in a peripheral portion.

3. The secondary battery in accordance with claim 2, wherein at least one of said positive electrode current collector terminal plate and said negative electrode current collector terminal plate has a protrusion that engages in the slit of said coned disc spring.

4. The secondary battery in accordance with claim 1, wherein said elastic member is covered with at least one metal selected from chromium and nickel.

* * * * *